United States Patent [19]
Ishida et al.

[11] Patent Number: 5,510,897
[45] Date of Patent: Apr. 23, 1996

[54] DIGITAL VIDEO SIGNAL RECORDING APPARATUS AND METHOD

[75] Inventors: Keiichi Ishida, Kobe; Masaaki Higashida, Neyagawa, both of Japan

[73] Assignee: Matsushita Electric Industrial Co., Ltd., Osaka, Japan

[21] Appl. No.: 188,895

[22] Filed: Jan. 31, 1994

[30] Foreign Application Priority Data

| Feb. 4, 1993 | [JP] | Japan | 5-017247 |
| Mar. 18, 1993 | [JP] | Japan | 5-058221 |
| Sep. 20, 1993 | [JP] | Japan | 5-232901 |

[51] Int. Cl.$^6$ .............................. H04N 9/797; H04N 9/80
[52] U.S. Cl. ............................................................ 358/310
[58] Field of Search .................................. 358/310, 335, 358/342, 330; 360/22, 23, 24, 32, 33.1; H04N 9/79, 5/76, 5/782, 9/797, 9/80

[56] References Cited

U.S. PATENT DOCUMENTS

| 4,882,732 | 11/1989 | Kaminaga | 371/37.4 |
| 5,068,727 | 11/1991 | Haghiri et al. | 348/412 |
| 5,113,243 | 5/1992 | Fautier | 348/469 |
| 5,142,537 | 8/1992 | Kutner et al. | 348/608 |
| 5,146,324 | 9/1992 | Miller et al. | 348/384 |
| 5,257,104 | 10/1993 | Asai | 348/478 |
| 5,301,018 | 4/1994 | Smidth et al. | 348/420 |
| 5,325,370 | 6/1994 | Cleveland et al. | 371/37.4 |

FOREIGN PATENT DOCUMENTS

| 0431699 | 6/1991 | European Pat. Off. |
| 0469860 | 2/1992 | European Pat. Off. |
| 0523708 | 1/1993 | European Pat. Off. |
| 2199982 | 7/1988 | United Kingdom . |

OTHER PUBLICATIONS

Laurence Thope et al., "HDTV Digital VTR", SMPTE Journal, vol. 98, No. 10, Oct. 1989, pp. 738–747.
Richard Brush, "Video data shuffling for the 4:2:2 DVTR", SMPTE Journal, vol. 95, No. 10, Oct. 1986, pp. 1009–1016.
Proposed SMPTE Standard SMPTE 227M, "Helical Data and Control Records", issued by SMPTE Journal, Mar. 1992, pp. 203–222.
"Encoding Parameters of Digital Television for Studios", by CCIR Study Groups, CCIR Rec. 601, Document 11/82–E, 7 Feb. 1992.
"SMPTE Standard 125M", issued by SMPTE Journal, 1991.

*Primary Examiner*—Tommy P. Chin
*Assistant Examiner*—Khoi Truong
*Attorney, Agent, or Firm*—Greenblum & Bernstein

[57] ABSTRACT

A digital video signal recording apparatus records a video signal expressed by four digital components such that even numbered pixel is expressed by a first type luminance signal component and two color difference signal components, and odd numbered pixel is expressed by a second type luminance signal component. For the 525/60 NTSC system with 3-segment and 4-channel arrangement, one field video signal is stored in three segments. The recording apparatus has a standard channel order generator for generating a standard channel order of a recurring channel pattern. The four digital components are aligned based on the recurring channel pattern so that the first type luminance signal component and two color difference signal components for the even numbered pixel are stored in a same segment by the same channel. As a result, the samples for the same-position pixels are recorded by the same recording head, adjacent samples are recorded by different heads, and error concealment functions effectively.

38 Claims, 18 Drawing Sheets

⊗ --- Y,Cb,Cr SAMPLING POINT

✕ --- ONLY Y SAMPLING POINT

Fig.5 lin=0

| pix  | : 0  | 1  | 2  | 3  | 4  | 5  | 6  | 7  | 8  | 9  | 10 | 11 | 12 | 13 | ...22 | 23 | 24 | 25 | 26 | 27 | 28 | 29 | ... |
|------|------|----|----|----|----|----|----|----|----|----|----|----|----|----|-------|----|----|----|----|----|----|----|-----|
| grp  | : 0  | 0  | 0  | 0  | 0  | 0  | 1  | 1  | 1  | 1  | 1  | 1  | 2  | 2  | ...3  | 3  | 4  | 4  | 4  | 4  | 4  | 4  | ... |
| ph   | : 0  | 1  | 2  | 3  | 4  | 5  | 0  | 1  | 2  | 3  | 4  | 5  | 0  | 1  | ...4  | 5  | 0  | 1  | 2  | 3  | 4  | 5  | ... |
| ch   | : ⌈0 | 3  | 2  | 0  | 3  | 3⌉ | 1  | 0  | 3  | 1  | 0  | 0  | 2  | 1  | ...2  | 2  | 0  | 3  | 2  | 0  | 3  | 3  | ... |
| seg  | : 0  | 1  | 2  | 0  | 1  | 2  | 0  | 1  | 2  | 0  | 1  | 2  | 0  | 1  | ...1  | 2  | 0  | 1  | 2  | 0  | 1  | 2  | ... |
| head | : 0a | 3b | 2a | 0a | 3b | 3a | 1a | 0b | 3a | 1a | 0b | 0a | 2a | 1b | ...2b | 2a | 0a | 3b | 2a | 0a | 3b | 3a | ... |
| splseg| : 0 | 0  | 0  | 0  | 0  | 0  | 0  | 0  | 0  | 0  | 0  | 0  | 0  | 0  | ...0  | 0  | 1  | 1  | 1  | 1  | 1  | 1  | ... | lin=1

↓ V

| pix  | : 0  | 1  | 2  | 3  | 4  | 5  | 6  | 7  | 8  | 9  | 10 | 11 | 12 | 13 | ...22 | 23 | 24 | 25 | 26 | 27 | 28 | 29 | ... |
|------|------|----|----|----|----|----|----|----|----|----|----|----|----|----|-------|----|----|----|----|----|----|----|-----|
| grp  | : 0  | 0  | 0  | 0  | 0  | 0  | 1  | 1  | 1  | 1  | 1  | 1  | 2  | 2  | ...3  | 3  | 4  | 4  | 4  | 4  | 4  | 4  | ... |
| ph   | : 0  | 1  | 2  | 3  | 4  | 5  | 0  | 1  | 2  | 3  | 4  | 5  | 0  | 1  | ...4  | 5  | 0  | 1  | 2  | 3  | 4  | 5  | ... |
| ch   | : ⌈1 | 0  | 3  | 1  | 0  | 0⌉ | 2  | 1  | 0  | 2  | 1  | 1  | 3  | 2  | ...3  | 3  | 1  | 0  | 3  | 1  | 0  | 0  | ... |
| seg  | : 0  | 1  | 2  | 0  | 1  | 2  | 0  | 1  | 2  | 0  | 1  | 2  | 0  | 1  | ...1  | 2  | 0  | 1  | 2  | 0  | 1  | 2  | ... |
| head | : 1a | 0b | 3a | 1a | 0b | 0a | 2a | 1b | 0a | 2a | 1b | 1a | 3a | 2b | ...3b | 3a | 1a | 0b | 3a | 1a | 0b | 0a | ... |
| splseg| : 0 | 0  | 0  | 0  | 0  | 0  | 0  | 0  | 0  | 0  | 0  | 0  | 0  | 0  | ...0  | 0  | 1  | 1  | 1  | 1  | 1  | 1  | ... | lin=2

| pix  | : 0  | 1  | 2  | 3  | 4  | 5  | 6  | 7  | 8  | 9  | 10 | 11 | 12 | 13 | ...22 | 23 | 24 | 25 | 26 | 27 | 28 | 29 | ... |
|------|------|----|----|----|----|----|----|----|----|----|----|----|----|----|-------|----|----|----|----|----|----|----|-----|
| grp  | : 0  | 0  | 0  | 0  | 0  | 0  | 1  | 1  | 1  | 1  | 1  | 1  | 2  | 2  | ...3  | 3  | 4  | 4  | 4  | 4  | 4  | 4  | ... |
| ph   | : 0  | 1  | 2  | 3  | 4  | 5  | 0  | 1  | 2  | 3  | 4  | 5  | 0  | 1  | ...4  | 5  | 0  | 1  | 2  | 3  | 4  | 5  | ... |
| ch   | : ⌈2 | 1  | 0  | 2  | 1  | 1⌉ | 3  | 2  | 1  | 3  | 2  | 2  | 0  | 3  | ...0  | 0  | 2  | 1  | 0  | 2  | 1  | 1  | ... |
| seg  | : 0  | 1  | 2  | 0  | 1  | 2  | 0  | 1  | 2  | 0  | 1  | 2  | 0  | 1  | ...1  | 2  | 0  | 1  | 2  | 0  | 1  | 2  | ... |
| head | : 2a | 1b | 0a | 2a | 1b | 1a | 3a | 2b | 1a | 3a | 2b | 2a | 0a | 3b | ...0b | 0a | 2a | 1b | 0a | 2a | 1b | 1a | ... |
| splseg| : 0 | 0  | 0  | 0  | 0  | 0  | 0  | 0  | 0  | 0  | 0  | 0  | 0  | 0  | ...0  | 0  | 1  | 1  | 1  | 1  | 1  | 1  | ... | lin=3

| pix  | : 0  | 1  | 2  | 3  | 4  | 5  | 6  | 7  | 8  | 9  | 10 | 11 | 12 | 13 | ...22 | 23 | 24 | 25 | 26 | 27 | 28 | 29 | ... |
|------|------|----|----|----|----|----|----|----|----|----|----|----|----|----|-------|----|----|----|----|----|----|----|-----|
| grp  | : 0  | 0  | 0  | 0  | 0  | 0  | 1  | 1  | 1  | 1  | 1  | 1  | 2  | 2  | ...3  | 3  | 4  | 4  | 4  | 4  | 4  | 4  | ... |
| ph   | : 0  | 1  | 2  | 3  | 4  | 5  | 0  | 1  | 2  | 3  | 4  | 5  | 0  | 1  | ...4  | 5  | 0  | 1  | 2  | 3  | 4  | 5  | ... |
| ch   | : ⌈3 | 2  | 1  | 3  | 2  | 2⌉ | 0  | 3  | 2  | 0  | 3  | 3  | 1  | 0  | ...1  | 1  | 3  | 2  | 1  | 3  | 2  | 2  | ... |
| seg  | : 0  | 1  | 2  | 0  | 1  | 2  | 0  | 1  | 2  | 0  | 1  | 2  | 0  | 1  | ...1  | 2  | 0  | 1  | 2  | 0  | 1  | 2  | ... |
| head | : 3a | 2b | 1a | 3a | 2b | 2a | 0a | 3b | 2a | 0a | 3b | 3a | 1a | 0b | ...1b | 1a | 3a | 2b | 1a | 3a | 2b | 2a | ... |
| splseg| : 0 | 0  | 0  | 0  | 0  | 0  | 0  | 0  | 0  | 0  | 0  | 0  | 0  | 0  | ...0  | 0  | 1  | 1  | 1  | 1  | 1  | 1  | ... | lin=4

| pix  | : 0  | 1  | 2  | 3  | 4  | 5  | 6  | 7  | 8  | 9  | 10 | 11 | 12 | 13 | ...22 | 23 | 24 | 25 | 26 | 27 | 28 | 29 | ... |
|------|------|----|----|----|----|----|----|----|----|----|----|----|----|----|-------|----|----|----|----|----|----|----|-----|
| grp  | : 0  | 0  | 0  | 0  | 0  | 0  | 1  | 1  | 1  | 1  | 1  | 1  | 2  | 2  | ...3  | 3  | 4  | 4  | 4  | 4  | 4  | 4  | ... |
| ph   | : 0  | 1  | 2  | 3  | 4  | 5  | 0  | 1  | 2  | 3  | 4  | 5  | 0  | 1  | ...4  | 5  | 0  | 1  | 2  | 3  | 4  | 5  | ... |
| ch   | : ⌈0 | 3  | 2  | 0  | 3  | 3⌉ | 1  | 0  | 3  | 1  | 0  | 0  | 2  | 1  | ...2  | 2  | 0  | 3  | 2  | 0  | 3  | 3  | ... |
| seg  | : 0  | 1  | 2  | 0  | 1  | 2  | 0  | 1  | 2  | 0  | 1  | 2  | 0  | 1  | ...1  | 2  | 0  | 1  | 2  | 0  | 1  | 2  | ... |
| head | : 0a | 3b | 2a | 0a | 3b | 3a | 1a | 0b | 3a | 1a | 0b | 0a | 2a | 1b | ...2b | 2a | 0a | 3b | 2a | 0a | 3b | 3a | ... |
| splseg| : 0 | 0  | 0  | 0  | 0  | 0  | 0  | 0  | 0  | 0  | 0  | 0  | 0  | 0  | ...0  | 0  | 1  | 1  | 1  | 1  | 1  | 1  | ... |

Fig.6 lin=0                                                              → H

| pix    | : 0  | 1  | 2  | 3  | 4  | 5  | 6  | 7  | 8  | 9  | 10 | 11 | 12 | 13 | …32 | 33 | 34 | 35 | 36 | 37 | 38 | 39 | … |
|--------|------|----|----|----|----|----|----|----|----|----|----|----|----|----|-----|----|----|----|----|----|----|----|---|
| grp    | : 0  | 0  | 0  | 0  | 0  | 0  | 0  | 0  | 1  | 1  | 1  | 1  | 1  |    | …4  | 4  | 4  | 4  | 4  | 4  | 4  | 4  | … |
| ph     | : 0  | 1  | 2  | 3  | 4  | 5  | 6  | 7  | 0  | 1  | 2  | 3  | 4  | 5  | …0  | 1  | 2  | 3  | 4  | 5  | 6  | 7  | … |
| ch     | : 0  | 2  | 1  | 3  | 0  | 2  | 1  | 3  | 1  | 3  | 2  | 0  | 1  | 3  | …0  | 2  | 1  | 3  | 0  | 2  | 1  | 3  | … |
| seg    | : 0  | 0  | 1  | 1  | 2  | 2  | 3  | 3  | 0  | 0  | 1  | 1  | 2  | 2  | …0  | 0  | 1  | 1  | 2  | 2  | 3  | 3  | … |
| head   | : 0a | 2a | 1b | 3b | 0a | 2a | 1b | 3b | 1a | 3a | 2b | 0b | 1a | 3a | …0a | 2a | 1b | 3b | 0a | 2a | 1b | 3b | … |
| splseg | : 0  | 0  | 0  | 0  | 0  | 0  | 0  | 0  | 0  | 0  | 0  | 0  | 0  | 0  | …1  | 1  | 1  | 1  | 1  | 1  | 1  | 1  | … | lin=1

| pix    | : 0  | 1  | 2  | 3  | 4  | 5  | 6  | 7  | 8  | 9  | 10 | 11 | 12 | 13 | …32 | 33 | 34 | 35 | 36 | 37 | 38 | 39 | … |
|--------|------|----|----|----|----|----|----|----|----|----|----|----|----|----|-----|----|----|----|----|----|----|----|---|
| grp    | : 0  | 0  | 0  | 0  | 0  | 0  | 0  | 0  | 1  | 1  | 1  | 1  | 1  |    | …4  | 4  | 4  | 4  | 4  | 4  | 4  | 4  | … |
| ph     | : 0  | 1  | 2  | 3  | 4  | 5  | 6  | 7  | 0  | 1  | 2  | 3  | 4  | 5  | …0  | 1  | 2  | 3  | 4  | 5  | 6  | 7  | … |
| ch     | : 1  | 3  | 2  | 0  | 1  | 3  | 2  | 0  | 2  | 0  | 3  | 1  | 2  | 0  | …1  | 3  | 2  | 0  | 1  | 3  | 2  | 0  | … |
| seg    | : 0  | 0  | 1  | 1  | 2  | 2  | 3  | 3  | 0  | 0  | 1  | 1  | 2  | 2  | …0  | 0  | 1  | 1  | 2  | 2  | 3  | 3  | … |
| head   | : 1a | 3a | 2b | 0b | 1a | 3a | 2b | 0b | 2a | 0a | 3b | 1b | 2a | 0a | …1a | 3a | 2b | 0b | 1a | 3a | 2b | 0b | … |
| splseg | : 0  | 0  | 0  | 0  | 0  | 0  | 0  | 0  | 0  | 0  | 0  | 0  | 0  | 0  | …1  | 1  | 1  | 1  | 1  | 1  | 1  | 1  | … |

↓ V lin=2

| pix    | : 0  | 1  | 2  | 3  | 4  | 5  | 6  | 7  | 8  | 9  | 10 | 11 | 12 | 13 | …32 | 33 | 34 | 35 | 36 | 37 | 38 | 39 | … |
|--------|------|----|----|----|----|----|----|----|----|----|----|----|----|----|-----|----|----|----|----|----|----|----|---|
| grp    | : 0  | 0  | 0  | 0  | 0  | 0  | 0  | 0  | 1  | 1  | 1  | 1  | 1  |    | …4  | 4  | 4  | 4  | 4  | 4  | 4  | 4  | … |
| ph     | : 0  | 1  | 2  | 3  | 4  | 5  | 6  | 7  | 0  | 1  | 2  | 3  | 4  | 5  | …0  | 1  | 2  | 3  | 4  | 5  | 6  | 7  | … |
| ch     | : 2  | 0  | 3  | 1  | 2  | 0  | 3  | 1  | 3  | 1  | 0  | 2  | 3  | 1  | …2  | 0  | 3  | 1  | 2  | 0  | 3  | 1  | … |
| seg    | : 0  | 0  | 1  | 1  | 2  | 2  | 3  | 3  | 0  | 0  | 1  | 1  | 2  | 2  | …0  | 0  | 1  | 1  | 2  | 2  | 3  | 3  | … |
| head   | : 2a | 0a | 3b | 1b | 2a | 0a | 3b | 1b | 3a | 1a | 0b | 2b | 3a | 1a | …2a | 0a | 3b | 1b | 2a | 0a | 3b | 1b | … |
| splseg | : 0  | 0  | 0  | 0  | 0  | 0  | 0  | 0  | 0  | 0  | 0  | 0  | 0  | 0  | …1  | 1  | 1  | 1  | 1  | 1  | 1  | 1  | … | lin=3

| pix    | : 0  | 1  | 2  | 3  | 4  | 5  | 6  | 7  | 8  | 9  | 10 | 11 | 12 | 13 | …32 | 33 | 34 | 35 | 36 | 37 | 38 | 39 | … |
|--------|------|----|----|----|----|----|----|----|----|----|----|----|----|----|-----|----|----|----|----|----|----|----|---|
| grp    | : 0  | 0  | 0  | 0  | 0  | 0  | 0  | 0  | 1  | 1  | 1  | 1  | 1  |    | …4  | 4  | 4  | 4  | 4  | 4  | 4  | 4  | … |
| ph     | : 0  | 1  | 2  | 3  | 4  | 5  | 6  | 7  | 0  | 1  | 2  | 3  | 4  | 5  | …0  | 1  | 2  | 3  | 4  | 5  | 6  | 7  | … |
| ch     | : 3  | 1  | 0  | 2  | 3  | 1  | 0  | 2  | 0  | 2  | 1  | 3  | 0  | 2  | …3  | 1  | 0  | 2  | 3  | 1  | 0  | 2  | … |
| seg    | : 0  | 0  | 1  | 1  | 2  | 2  | 3  | 3  | 0  | 0  | 1  | 1  | 2  | 2  | …0  | 0  | 1  | 1  | 2  | 2  | 3  | 3  | … |
| head   | : 3a | 1a | 0b | 2b | 3a | 1a | 0b | 2b | 0a | 2a | 1b | 3b | 0a | 2a | …3a | 1a | 0b | 2b | 3a | 1a | 0b | 2b | … |
| splseg | : 0  | 0  | 0  | 0  | 0  | 0  | 0  | 0  | 0  | 0  | 0  | 0  | 0  | 0  | …1  | 1  | 1  | 1  | 1  | 1  | 1  | 1  | … | lin=4

| pix    | : 0  | 1  | 2  | 3  | 4  | 5  | 6  | 7  | 8  | 9  | 10 | 11 | 12 | 13 | …32 | 33 | 34 | 35 | 36 | 37 | 38 | 39 | … |
|--------|------|----|----|----|----|----|----|----|----|----|----|----|----|----|-----|----|----|----|----|----|----|----|---|
| grp    | : 0  | 0  | 0  | 0  | 0  | 0  | 0  | 0  | 1  | 1  | 1  | 1  | 1  |    | …4  | 4  | 4  | 4  | 4  | 4  | 4  | 4  | … |
| ph     | : 0  | 1  | 2  | 3  | 4  | 5  | 6  | 7  | 0  | 1  | 2  | 3  | 4  | 5  | …0  | 1  | 2  | 3  | 4  | 5  | 6  | 7  | … |
| ch     | : 0  | 2  | 1  | 3  | 0  | 2  | 1  | 3  | 1  | 3  | 2  | 0  | 1  | 3  | …0  | 2  | 1  | 3  | 0  | 2  | 1  | 3  | … |
| seg    | : 0  | 0  | 1  | 1  | 2  | 2  | 3  | 3  | 0  | 0  | 1  | 1  | 2  | 2  | …0  | 0  | 1  | 1  | 2  | 2  | 3  | 3  | … |
| head   | : 0a | 2a | 1b | 3b | 0a | 2a | 1b | 3b | 1a | 3a | 2b | 0b | 1a | 3a | …0a | 2a | 1b | 3b | 0a | 2a | 1b | 3b | … |
| splseg | : 0  | 0  | 0  | 0  | 0  | 0  | 0  | 0  | 0  | 0  | 0  | 0  | 0  | 0  | …1  | 1  | 1  | 1  | 1  | 1  | 1  | 1  | … |

| pix | 0 | 1 | 2 | 3 | 4 | 5 | 6 | 7 | 8 | 9 | 10 | 11 | 12 | 13 | ... |
|---|---|---|---|---|---|---|---|---|---|---|---|---|---|---|---|
| lin=0 | 0a | 3b | 2a | 0a | 3b | 3a | 1a | 0b | 3a | 1a | 0b | 0a | 2a | 1b | ... |
| lin=1 | 1a | 0b | 3a | 1a | 0b | 0a | 2a | 1b | 0a | 2a | 1b | 1a | 3a | 2b | ... |
| lin=2 | 2a | 1b | 0a | 2a | 1b | 1a | 3a | 2b | 1a | 3a | 2b | 2a | 0a | 3b | ... |
| lin=3 | 3a | 2b | 1a | 3a | 2b | 2a | 0a | 3b | 2a | 0a | 3b | 3a | 1a | 0b | ... |
| lin=4 | 0a | 3b | 2a | 0a | 3b | 3a | 1a | 0b | 3a | 1a | 0b | 0a | 2a | 1b | ... |

| pix | 0 | 2 | 4 | 6 | 8 | 10 | 12 | ... |
|---|---|---|---|---|---|---|---|---|
| lin=0 | 0a | 2a | 3b | 1a | 3a | 0b | 2a | ... |
| lin=1 | 1a | 3a | 0b | 2a | 0a | 1b | 3a | ... |
| lin=2 | 2a | 0a | 1b | 3a | 1a | 2b | 0a | ... |
| lin=3 | 3a | 1a | 2b | 0a | 2a | 3b | 1a | ... |
| lin=4 | 0a | 2a | 3b | 1a | 3a | 0b | 2a | ... |

(525 / 60 SYSTEM)

Fig. 8

| Line L−1 | Y | 0a | 3b | 2a | 0a | 3b | 3a | 1a | 0b | 0a | 2a | 1b |
|---|---|---|---|---|---|---|---|---|---|---|---|---|
| | Cb | 0a | 2a | 2a | 0a | 3b | 1a | 1a | 0b | 0a | 2a | 2a |
| | Cr | 0a | 2a | 2a | 0a | 3b | 1a | 1a | 0b | 0a | 2a | 2a |
| Line L | Y | 1a | 0b | 3a | 1a | 0b | 0a | 2a | 1b | 1a | 3a | 2b |
| | Cb | 1a | 3a | 3a | 1a | 0b | 2a | 0a | 1b | 1a | 3a | |
| | Cr | 1a | 3a | 3a | 1a | 0b | 2a | 0a | 1b | 1a | 3a | |
| Line L+1 | Y | 2a | 1b | 0a | 2a | 1b | 1a | 3a | 2b | 2a | 0a | 3b |
| | Cb | 2a | 0a | 0a | 2a | 1b | 3a | 1a | 2b | 2a | 0a | 0a |
| | Cr | 2a | 0a | 0a | 2a | 1b | 3a | 1a | 2b | 2a | 0a | 0a |

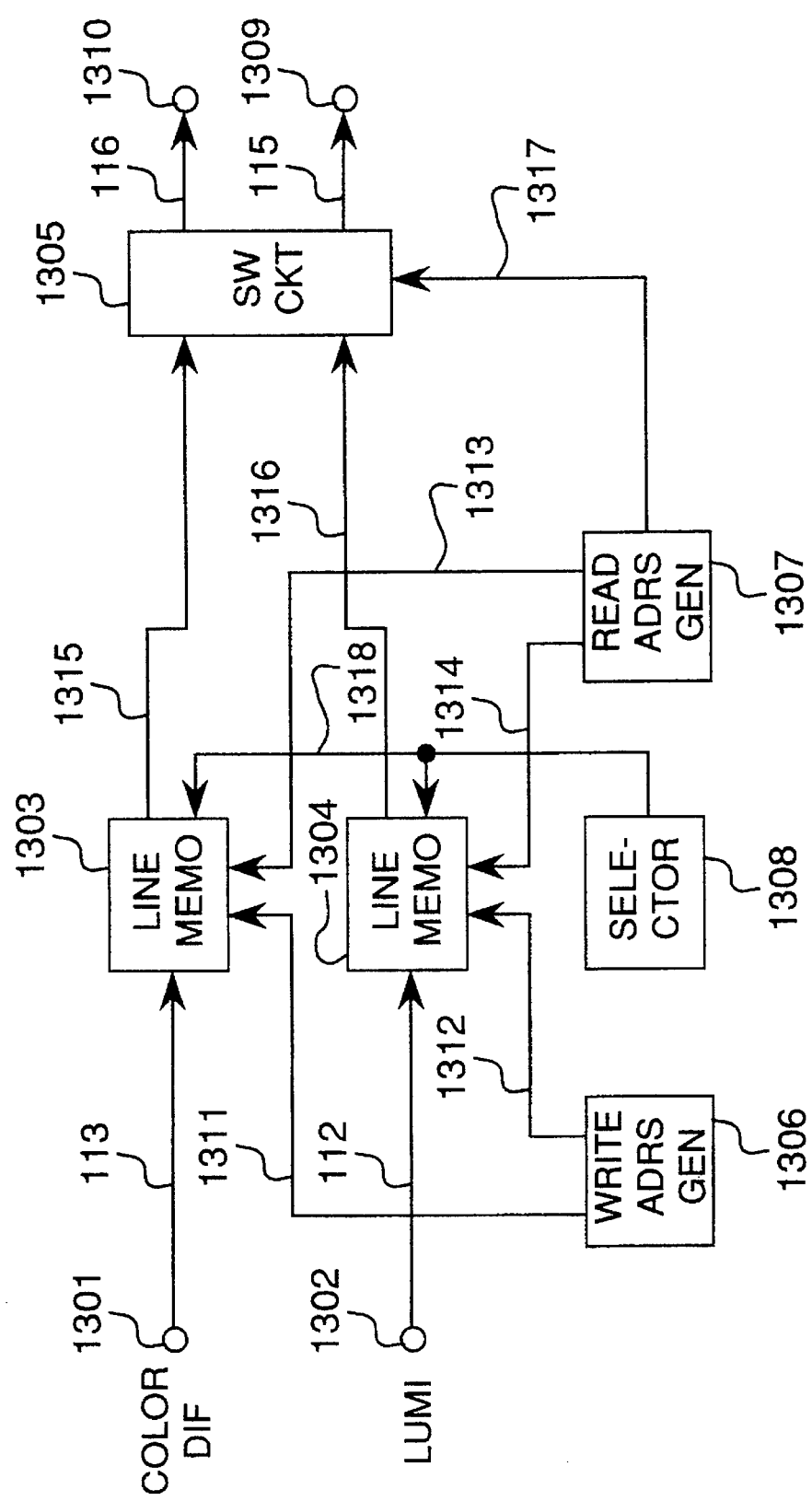

Fig.18 PRIOR ART

|  |  |  |  |  |  |  |  |  |  |  |  |  |
|---|---|---|---|---|---|---|---|---|---|---|---|---|
| LINE L−1 | Y  | 0 | 2 | 1 | 3 | 0 | 2 | 1 | 3 | 0 | 2 | 1 | 3 ---- |
|          | Cb | 0 |   | 2 |   | 1 |   | 3 |   | 0 |   | 2 |   ---- |
|          | Cr | 0 |   | 2 |   | 1 |   | 3 |   | 0 |   | 2 |   ---- |
| LINE L   | Y  | 1 | 3 | 0 | 2 | 1 | 3 | 0 | 2 | 1 | 3 | 0 | 2 ---- |
|          | Cb | 1 |   | 3 |   | 0 |   | 2 |   | 1 |   | 3 |   ---- |
|          | Cr | 1 |   | 3 |   | 0 |   | 2 |   | 1 |   | 3 |   ---- |
| LINE L+1 | Y  | 0 | 2 | 1 | 3 | 0 | 2 | 1 | 3 | 0 | 2 | 1 | 3 ---- |
|          | Cb | 0 |   | 2 |   | 1 |   | 3 |   | 0 |   | 2 |   ---- |
|          | Cr | 0 |   | 2 |   | 1 |   | 3 |   | 0 |   | 2 |   ---- |

DIGITAL VIDEO SIGNAL RECORDING APPARATUS AND METHOD

BACKGROUND OF THE INVENTION

1. Field of the invention

The present invention relates an apparatus for recording, reproducing, or transmitting a digitized component video signal, and specifically to a method of positioning a digital component video signal to the recording medium, and to a recording apparatus achieving such positioning, in a digital video cassette recorder or similar apparatus.

2. Description of the prior art

Digitization of component video signals currently conforms to CCIR Rec. 601, "Encoding parameters of digital television for studios." Based on this recommendation, the sampling frequency for the luminance signal is 13.5 MHz, the sampling frequency for the color difference signals is 6.75 MHz, and both luminance and color difference signals are quantized at 10 bits/sample. The valid sampling count in one horizontal scanning period is 720 samples for the luminance signal Y and 360 samples each for the two color difference signals Cb, Cr. Current television signals with a 4:3 aspect ratio and scanning format of either 525 lines at 60 Hz ("525/60 format" below) or 625 lines at 50 Hz ("625/50 format" below) are digitized according to this CCIR recommendation. The structure of the sampling points in this recommendation is shown in FIG. 2.

As shown in FIG. 2, points that are simultaneously sampled for the luminance signal Y and the color difference signals Cb, Cr alternate in each line with points sampled only for the luminance signal Y. In FIG. 2, for example, both the luminance signal Y and the color difference signals Cb, Cr are sampled for pixel 201, but only the luminance signal Y is sampled for pixel 202.

The so-called D-1 standard is used for conventional video tape recorders capable of recording/reproducing component video signals sampled according to CCIR Rec. 601. According to this D-1 standard, however, the data actually recorded to/reproduced from the video tape is only the high eight bits including the MSB of the 10-bit quantized data.

This D-1 standard is described in detail in "SMPTE 227M 19-mm type D-1 cassette-helical data and control records," SMPTE Journal, March 1992.

The tape pattern recorded in this D-1 digital VCR is shown in FIG. 17. In the D-1 standard, one field of each 525/60-format television image is divided into five segments, one field of each 625/50-format television image is divided into six segments, and signal processing is completed for data blocks of 50 horizontal scanning periods. The data for each segment is divided into four parts and distributed to four recording channels. The video data for one segment is recorded on four sectors, and thus four sectors 2, 3, 4, and 5 shown in FIG. 17 form one segment.

As shown in FIG. 17, these four video sectors 2, 3, 4, and 5 are located in four different tracks, and are therefore recorded/reproduced by four different heads. In other words, the video data distributed to each of four recording channels each forms one video sector, each of which is recorded/reproduced by a different head.

Distribution of the video data to four recording channels occurs each time the Y, Cb, and Cr components are sampled. This is illustrated in FIG. 18. This figure represents one sampled part of the complete television screen; for these three consecutive lines, the value shown for each Y, Cb, and Cr component sampling point indicates the number of the channel to which the sample is recorded.

As shown in FIG. 18, for each of the Y, Cb, and Cr component samples, the eight samples surrounding one sampling point (i.e., the sampling points above and below, right and left, and diagonally to the center sampling point; right and left sampling points taken at one sampling point intervals for the Y component, and two sampling point intervals for the Cb and Cr components) are always recorded to a recording channel different from that of the center sampling point. This is to enable image concealment when head clogging occurs with the objective being a reproduced image free of any visible image defects.

Head clogging as used herein occurs when one of the recording or reproducing heads functions abnormally either temporarily or permanently during recording or reproducing, and all data recorded by the recording head or reproduced by the reproducing head is in error. As a result, the number of error samples makes error correction using the error correction code impossible when head clogging occurs, and error detection only occurs during decoding of the error correction code. Detected error samples are therefore processed by means of error concealment so that they do not stand out from the surrounding image.

In error concealment, error samples detected by the error correction code are replaced with data obtained by selective interpolation filtering of the surrounding error-free pixel data (data from vertically, horizontally, or diagonally adjacent pixels) and processing the data so it does not stand out. It is therefore necessary for the samples surrounding the error sample to be as error-free as possible if image correction by error concealment is to function effectively.

Channel distribution in the D-1 standard is designed to assure this. As shown in FIG. 18, the surrounding eight samples of the discrete Y, Cb, and Cr components are recorded to a recording channel different from that of the recording channel of the error sample, thereby enabling recording/reproducing using a head free of head clogging when error samples from head clogging are detected.

As also shown in FIG. 18, however, the Cb and Cr component samples of the same pixel are always distributed to the same channel, and are therefore recorded by the same head. The Y component sample of the same pixel, however, is not necessarily recorded by the same head. Y samples recorded by the same head may be up to two horizontal pixels removed from the Cb and Cr component samples.

As a result, pixels for which only the Y component sample is in error and pixels for which only the Cb and Cr component samples are in error occur when head clogging occurs. Because a display pixel can only be generated when all three (Y, Cb, and Cr) components are available, pixels for which only the Y component sample is in error and pixels for which only the Cb and Cr component samples are in error must be handled as though a pixel error was detected.

The problem with this D-1 recording method, therefore, is that the number of display pixels containing errors and displayed by means of error concealment increases because the total number of pixel errors in the full screen image increases.

SUMMARY OF THE INVENTION

Therefore, an object of the present invention is to provide a method and a means of recording digital component video signals to a recording medium for improving the quality of the reproduced image by reducing the total number of error pixels in the full screen image and dispersing the error pixels through the entire image.

To achieve this object, a digital video recording apparatus according to the present invention records a digital component video signal to the recording medium by distributing the signal to plural recording channels and further dividing the signal into plural segments in each recording channel, and assigns the segments and the recording channel to which the samples associated with each pixel of the television screen are recorded pixel by pixel. This digital component video signal comprises even numbered pixels comprising both the luminance signal component sample and the two color difference signal component samples alternating in the horizontal direction with the odd numbered pixels comprising only the luminance signal component sample.

As a result, the luminance signal component sample and the two color difference signal component samples for the same pixel are always distributed to the same recording channel and to the same segment. Because the data for the same segment of the same recording channel is recorded by one recording head, determined by the position of the recording head in the scanner, the luminance signal component sample and the two color difference signal component samples for the same pixel are always recorded by the same recording head. In addition, because any two adjacent samples on the television screen, whether luminance signal component samples or the two color difference signal component samples, are obtained from different pixels, adjacent samples can be recorded by different recording heads.

As a result, even when head clogging occurs, the number of error pixels in the television screen can be reduced. In addition, because samples adjacent to the error samples are recorded by different recording heads for each component, errors do not result and sampling errors can be concealed.

With the present invention, the pixel sequence is changed by permutation within each of two pixel groups, specifically a pixel group comprising the even numbered pixels of the same horizontal line assigned to the same segment of the same recording channel and a pixel group comprising the odd numbered pixels.

Because the recording channel and segment of the distributed pixels do not change before and after resequencing, the recording channel and segment to which the luminance signal component sample and the two color difference signal component samples of the same pixel are distributed do not change.

As described above, the luminance signal component sample and the two color difference signal component samples are arranged in an adjacent alternating sequence before this resequencing, but can be recorded in a non-adjacent alternating order by resequencing as described above. This increases the probability that the samples near any given sampling error will not be in error, and error concealment is easier.

To achieve the above method of positioning data on the recording medium, a digital video recording apparatus according to the present invention for allocating the digital component video signal to plural recording channels, and further allocating the signal division allocated to each recording channel to plural segments for recording to the recording medium, comprises a line memory for storing for one horizontal scanning period the luminance signal component sample and the two color difference signal component samples forming each pixel, and a write address generator for generating the write address to which each sample is written in the line memory.

For the luminance signal component sample and the two color difference signal component samples of even numbered pixels, the write address includes the same recording channel number and segment number for all three samples as determined by the distribution method described above. For the luminance signal component sample of odd numbered pixels, the write address includes a recording channel number and segment number that are different from the values used as the address for the three-sample even-numbered pixels as determined by the distribution method described above. By writing each sample to these addresses in the line memory, the sample sequence determined by the above distribution method is formed in the line memory.

By reading the stored sample data in segment number sequence for each recording channel, the sample data of each segment in each recording channel corresponds to a specific recording head. As a result, the luminance signal component sample and the two color difference signal component samples belonging to the same on-screen pixel are recorded by the same recording head, and the pixel data for adjacent on-screen pixels is simultaneously recorded by different recording heads.

As a result, the number of error pixels on screen can be reduced even when head clogging occurs, and errors can be concealed using the sample data belonging to pixels adjacent to the error pixel but recorded by different recording heads.

BRIEF DESCRIPTION OF THE DRAWINGS

The present invention will become more fully understood from the detailed description given below and the accompanying diagrams wherein:

FIG. 5 is a diagram illustrating one pixel distribution pattern in the preferred embodiment of the invention, FIG. 6 is a diagram illustrating an alternative pixel distribution pattern in the preferred embodiment of the invention, FIG. 8 is a diagram illustrating the luminance signal component and color difference signal component distribution pattern when the distribution patterns of FIGS. 7a and 7b are taken together, FIG. 11 is a block diagram of the channel/segment distributor in the preferred embodiment of the invention, FIG. 18 is a diagram illustrating the sample data channel allocation method of the prior art, and showing a pattern similar to FIG. 8.

DESCRIPTION OF PREFERRED EMBODIMENTS

The first embodiment of the present invention is described below as applied in a video cassette recorder for recording/reproducing a digital component video signal sampled at an 18-MHz sampling frequency as described below.

At an 18-MHz sampling frequency, the luminance signal sampling frequency is 18 MHz and the color difference signal sampling frequency is 9 MHz. Both the luminance signal and the color difference signals are quantized at 8 bits/sample. The effective number of samples per line is 960 for the luminance signal Y and 480 for the two color difference signals Cb, Cr. To obtain the same horizontal resolution as in CCIR Rec. 601 in a wide 16:9 aspect ratio 525/60 or 625/50 format, this sampling method boosts the sampling frequency to 4/3 times 13.5 MHz, and expands the bandwidth horizontally.

Figure 2:
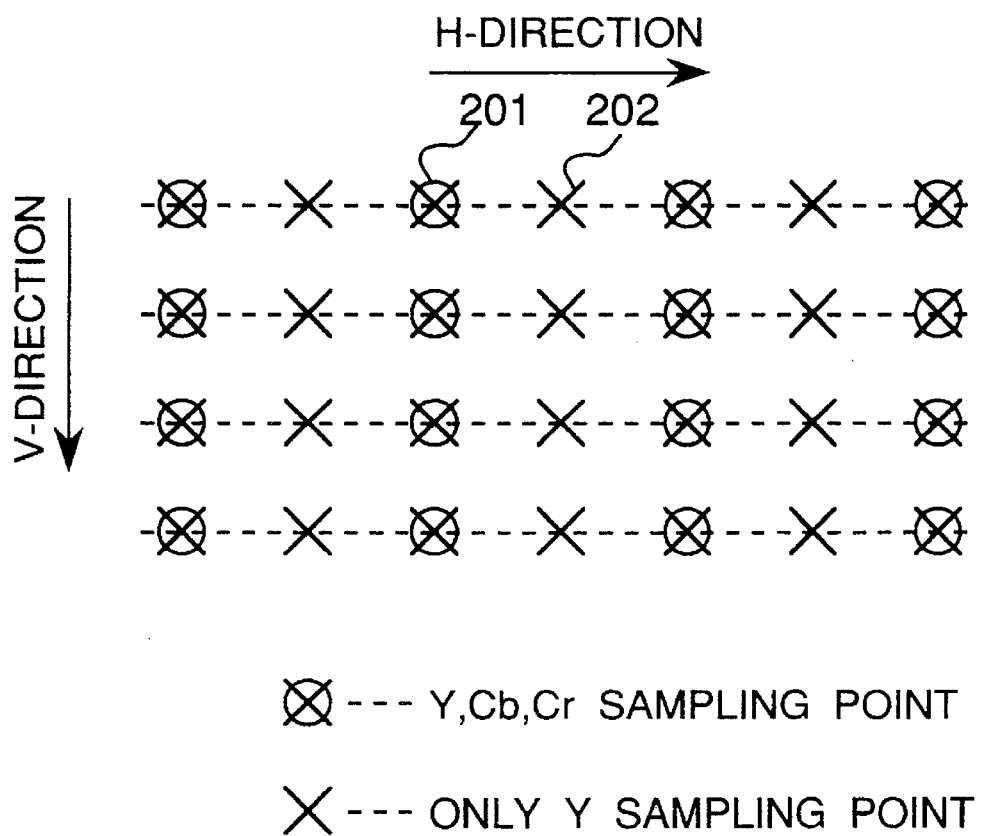
FIG. 2 is a diagram illustrating the digital video data sampling structure.

The structure of the sampling points at this 18-MHz sampling frequency is shown in FIG. 2, and conforms to CCIR Rec. 601. Specifically, pixels from which both the luminance signal Y and the two color difference signals Cb, Cr are sampled alternate in each line with the pixels from which only the luminance signal Y is sampled.

To simplify the following description, the sampled data is divided into two groups: the sample group of pixels for which both the luminance signal Y and the two color difference signals Cb, Cr are sampled, and the sample group of pixels for which only the luminance signal Y is sampled. The luminance signal Y component in the former sample group is referred to as the Yc component; the luminance signal Y component in the latter sample group is referred to as the Yi component. Thus, components Yc, Cb, and Cr are associated with pixel 201 in FIG. 2, and component Yi is associated with pixel 202.

Figure 3:
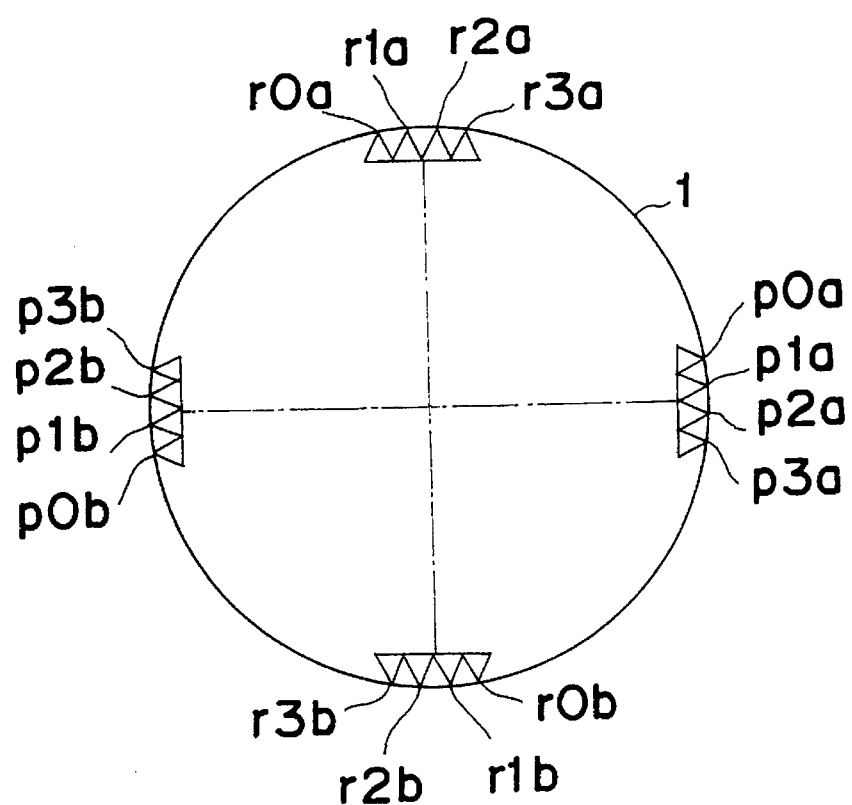
FIG. 3 is a plan view showing the head configuration in the preferred embodiment of the invention.

The head configuration of the digital VCR according to the present embodiment is shown in FIG. 3. As shown in FIG. 3, one set of four recording heads r0a, r1a, r2a, and r3a is mounted on rotating cylinder 1, another set of four recording heads r0b, r1b, r2b, and r3b is mounted on rotating cylinder 1 at a position 180 degrees away from the first set. Two sets of four reproducing heads (p0a, p1a, p2a, p3a, and p0b, p1b, p2b, p3b) separated 180 degrees are provided offset 90 degrees from the recording head sets.

The number of simultaneously recorded signals is referred to as the number of recording channels, and is 4 in this embodiment. Recording heads r0a and r0b are the recording heads for recording channel 0, r1a and r1b are the recording heads for recording channel 1, r2a and r2b are the recording heads for recording channel 2, and r3a and r3b are the recording heads for recording channel 3. Similarly, reproducing heads p0a and p0b are the reproducing heads for recording channel 0, p1a and p1b are the reproducing heads for recording channel 1, p2a and p2b are the reproducing heads for recording channel 2, and p3a and p3b are the reproducing heads for recording channel 3.

The tape winding angle is 180 degrees. This means that during the first half revolution of the rotating cylinder 1 when the four recording heads r0a, r1a, r2a, and r3a on side a function, the four recording heads r0b, r1b, r2b, and r3b on side b do not function; during the next half revolution, the four side b recording heads r0b, r1b, r2b, and r3b function, and the four side a recording heads r0a, r1a, r2a, and r3a do not function. Thus, the functioning side of the rotating cylinder 1 changes every half revolution. As a result, one recording track is formed by the functioning recording heads every half revolution of the rotating cylinder 1. The same is true of the reproducing heads.

Figure 4:
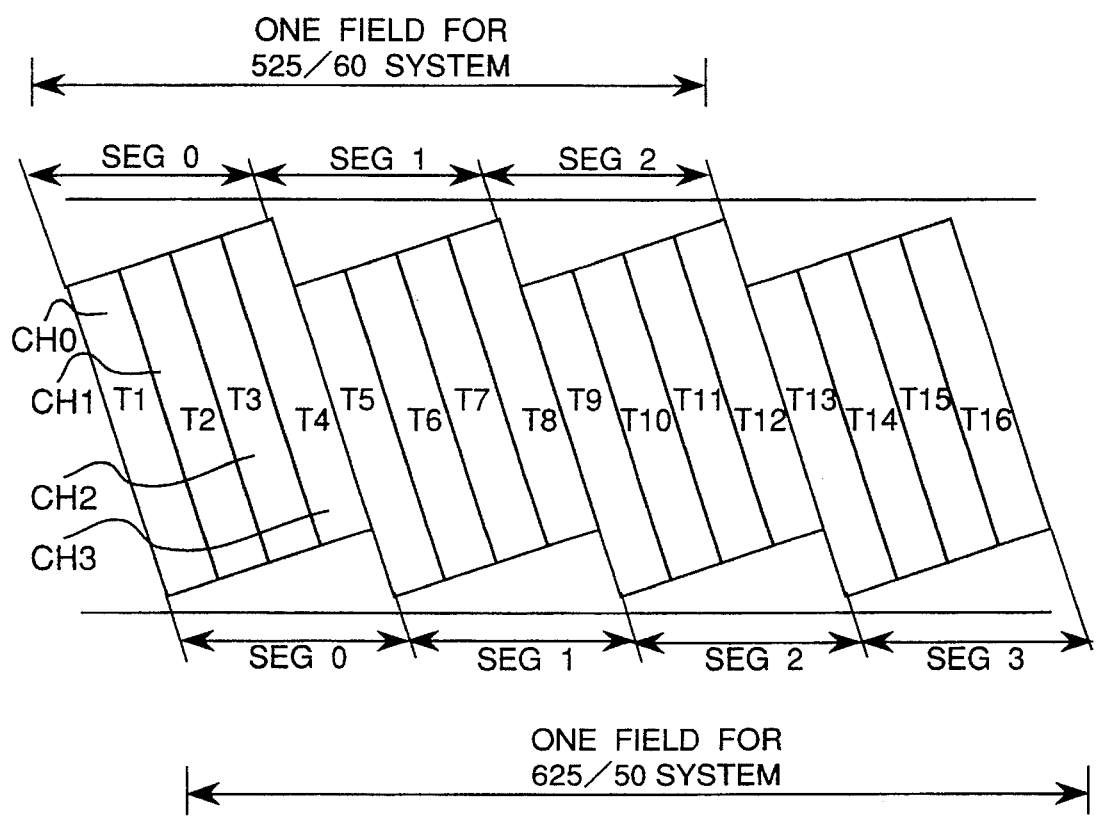
FIG. 4 is a diagram illustrating the tape pattern in the preferred embodiment of the invention.

The tape pattern recorded by this embodiment is shown in FIG. 4.

In the 525/60 format, the valid data for one field is recorded by three scans: the rotating cylinder 1 rotates 1.5 revolution and three tracks are formed for each recording channel. In the 625/50-format, the valid data for one field is recorded by four scans: the rotating cylinder 1 rotates 2 revolutions and four tracks are formed for each recording channel.

The four tracks corresponding to ½ revolution of the rotating cylinder 1 in one field form one segment. The segments are sequentially numbered 0, 1, 2 in the 525/60 format, and 0, 1, 2, 3 in the 625/50-format. Specifically, one field is recorded to three segments of twelve tracks (T1–T12) in the 525/60 format (FIG. 4) with tracks T1, T2, T3, T4 forming segment 0, tracks T5, T6, T7, T8 forming segment 1, and tracks T9, T10, T11, T12 forming segment 2. Similarly, one field is recorded to four segments of sixteen tracks (T1–T16) in the 625/50-format with tracks T1, T2, T3, T4 forming segment 0, tracks T5, T6, T7, T8 forming segment 1, tracks T9, T10, T11, T12 forming segment 2, and tracks T13, T14, T15, T16 forming segment 3.

In the 525/60 format, therefore, if tracks T1, T2, T3, T4 (segment 0) are formed in the first half revolution of the rotating cylinder 1 by the side-a recording heads r0a, r1a, r2a, and r3a, tracks T5, T6, T7, T8 (segment 1) are formed by the side-b recording heads r0b, r1b, r2b, and r3b in the next half revolution, and tracks T9, T10, T11, T12 (segment 2) are formed by the side-a recording heads r0a, r1a, r2a, and r3a in the third half revolution. The same principle applies in the 625/50-format: if tracks T1, T2, T3, T4 (segment 0) are formed in the first half revolution of the rotating cylinder 1 by the side-a recording heads r0a, r1a, r2a, and r3a, tracks T5, T6, T7, T8 (segment 1) are formed by the side-b recording heads r0b, r1b, r2b, and r3b, tracks T9, T10, T11, T12 (segment 2) are formed by the side-a recording heads r0a, r1a, r2a, and r3a, and tracks T13, T14, T15, T16 (segment 3) are formed by the side-b recording heads r0b, r1b, r2b, and r3b.

Error correction using product coding is applied in this embodiment. The first error correction code is called the "outer code." One outer code comprises each of the Yc, Yi, Cb, and Cr components of each line of each recording channel. As a result, there are four outer code words for each line of one recording channel. One outer code word is 120 bytes long. An 8-byte Reed-Solomon check code is then added to this 120-byte code.

Figures 7A, 7B, 9:
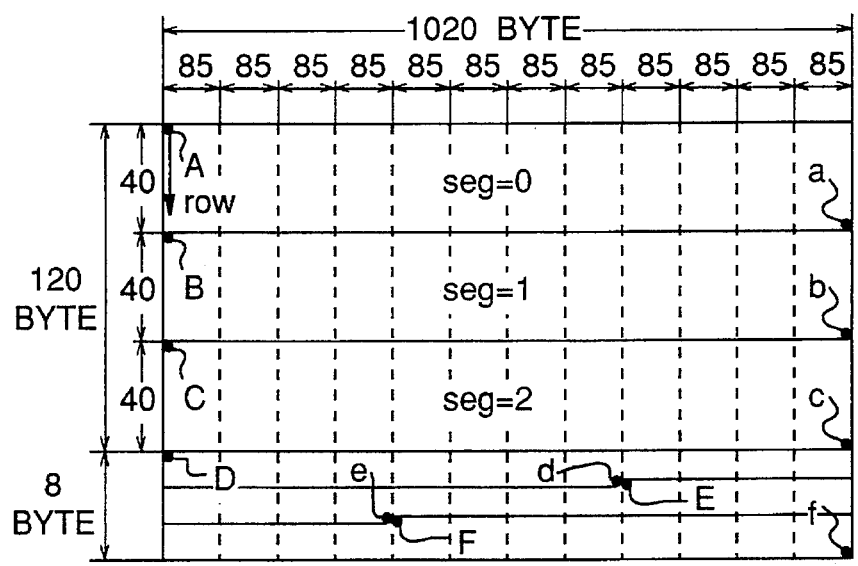
FIG. 7a is a diagram illustrating the luminance signal component distribution pattern in the preferred embodiment of the invention.
FIG. 7b is a diagram illustrating the color difference signal component distribution pattern in the preferred embodiment of the invention.
FIG. 9 is a diagram illustrating the memory map of the field memory in the preferred embodiment of the invention.
Figure 10:
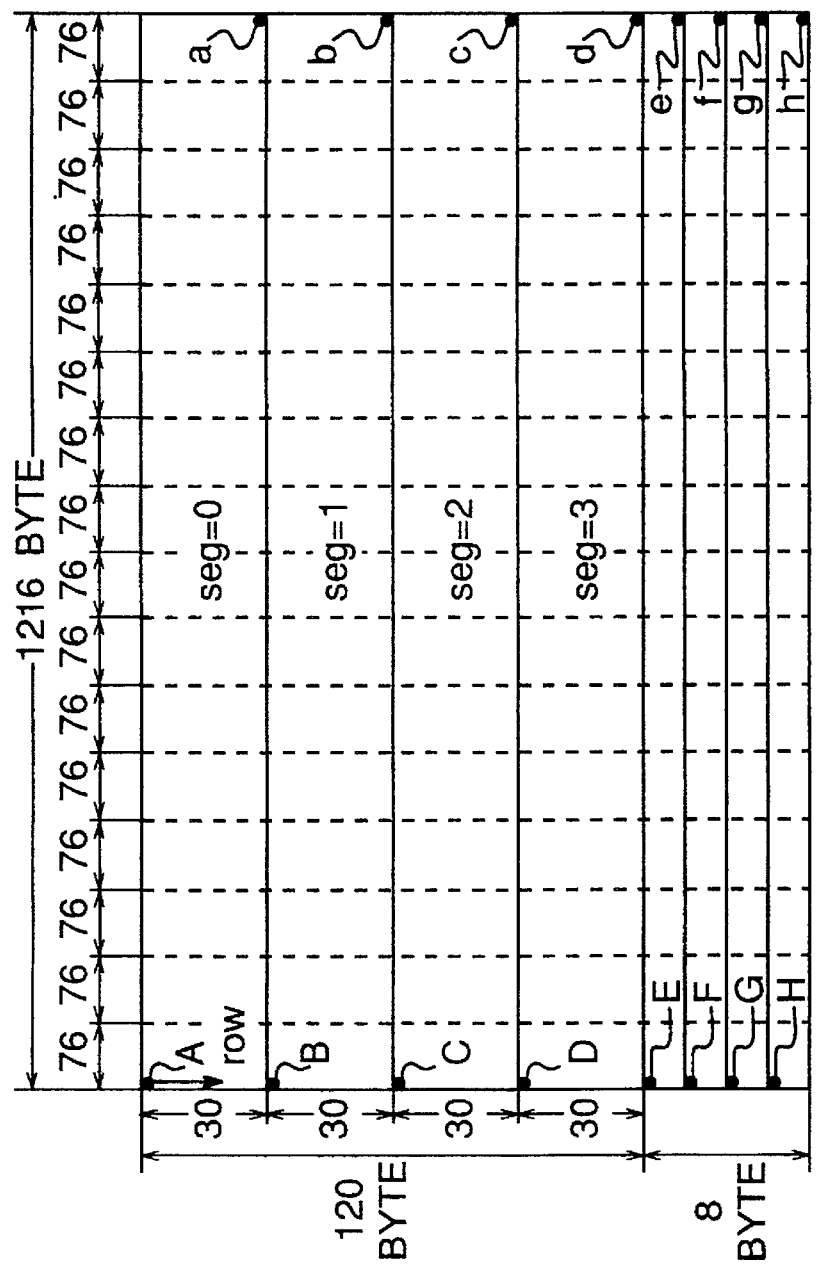
FIG. 10 is a diagram illustrating an alternative memory map for the field memory of the preferred embodiment of the invention.

To generate this product code, the outer coded data is distributed to a two-dimensional array. The array is formed using one field memory for each recording channel. The field memory maps for the 525/60 format and 625/50 format are shown in FIGS. 9 and 10, respectively. The data in these figures is referenced by vertical columns and horizontal rows.

In the 525/60 format, each column comprises a total 128 bytes of data (120 bytes of outer code video data and 8 bytes of outer check data as shown in FIG. 9). The 120 bytes of outer code video data and 8 check data bytes are similarly arranged in one column in the 625/50 format as shown in FIG. 10.

The number of valid recording lines per field in this embodiment is 255 in the 525/60 format and 304 in the 625/50 format. Because there are four outer code words/line in one channel as described above, there are 255 lines * 4 words=1020 outer code words per field channel. In the 625/50-format, there are 304*4=1216 words. Thus as shown in FIGS. 9 and 10, each row in the 525/60 format is 1020 bytes wide, and 1216 bytes in the 625/50-format.

The inner code used as the second error correction code is generated by reading the data from the array rows, resulting in a so-called "product code." In the 525/60 format, the inner code adds an 8-byte check word to the 85-byte video data. In the 625/50 format, the inner code adds an 8-byte check word to the 76-byte video data.

Thus, the error correction matrix comprises the data from one field for each channel. The field data is then divided into three segments in the 525/60 format or four segments in the 625/50 format for recording. This means that the 120 video data rows and 8 outer parity rows are divided into three or four parts with each part recorded as one segment. More specifically, in the 525/60 format, reading starts from point D (FIG. 9) and proceeds to point d, at which point ⅓ of the outer check data is read. Reading then proceeds from point A to point a to read ⅓ of the video data and complete one segment. The next segment is generated by reading from point E to e, and then from B to b. The next segment is generated by reading from point F to f, and then from C to c. In the 625/50 format as shown in FIG. 10, reading starts from E to e to read the first ¼ outer check data, then reads the first ¼ video data from A to a to form one segment. The next segment is generated by reading from F to f and then from B to b, and the following segment is generated by reading from G to g and then from C to c. The next segment is then read from H to h and then from D to d.

Figure 1:
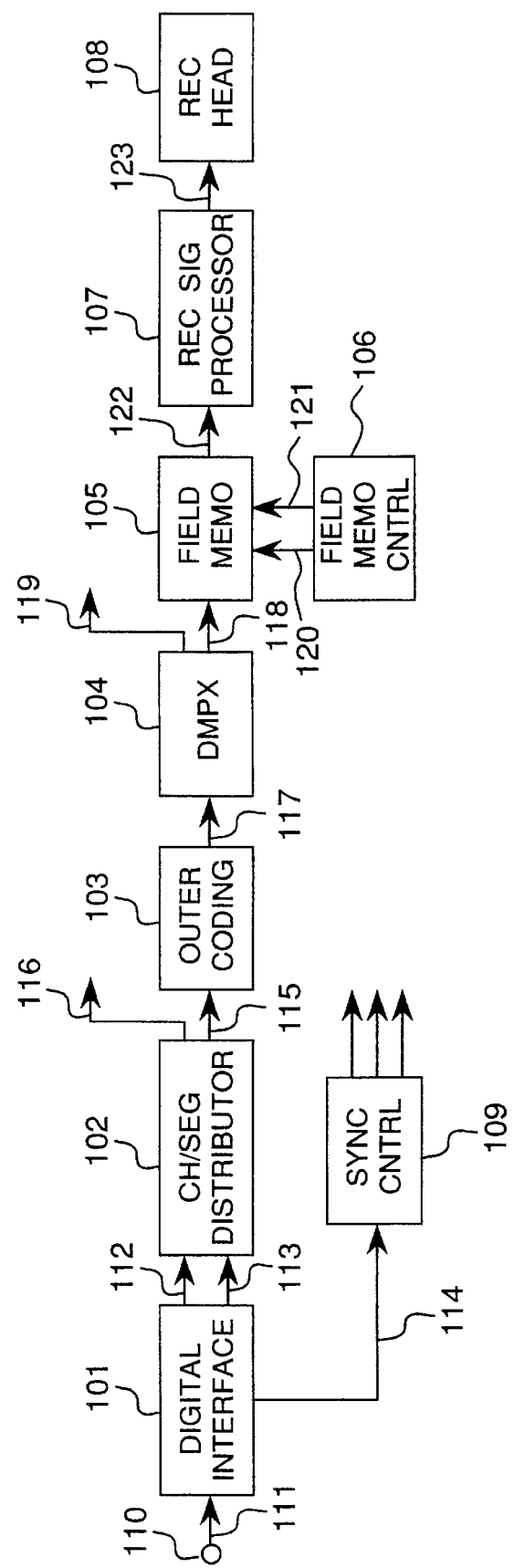
FIG. 1 is a block diagram of the digital video recording apparatus according to the preferred embodiment of the invention.

FIG. 1 is an overall block diagram of a video cassette recorder according to the preferred embodiment of the invention.

Referring to FIG. 1, the digital component video signal is input through input terminal 110 to the digital interface circuit 101. The digital interface circuit 101 separates and outputs to the channel/segment distributor 102 the luminance signal 112 and the color difference signals 113 from the component digital signal 111 comprising time division multiplexed luminance signal and color difference signal components, and outputs the synchronization signal 114 to the synchronization controller 109.

The channel/segment distributor 102 assigns by the method described below the channels and segments to which the pixels will be recorded, and outputs the channel 0 and channel 1 data 115 and the channel 2 and channel 3 data 116. The outer coding circuit 103 applies outer coding to the channel 0 and channel 1 data 115. The demultiplexer 104 separates the outer-coded 0/1 channel data 117 into the channel 0 data 118 and channel 1 data 119. The field memory 105 is used for the error correction matrix. The field memory controller 106 controls field memory reading and writing. The recording signal processor 107 applies inner coding and digital modulation, and outputs the recording signal 123 to the recording head 108 for recording to tape.

The component digital signal 111 input from the input terminal 110 is generated by time division multiplexing (TDM) the luminance signal sample Y and two color difference signals Cb, Cr in the alternating sequence Cb, Y, Cr, Y . . . with the encoded horizontal and vertical synchronization timing multiplexed to the data in conformance with SMPTE standard 125M (SMPTE Journal, September 1991).

The sampling clock used to generate this component digital signal 111 differs from the SMPTE 125M specification. Specifically, the luminance signal component sampling frequency is 18 MHz, the color difference signal component sampling frequency is 9 MHz, and the clock rate of the multiplexed signal 111 is 36 MHz.

The digital interface circuit 101 detects the multiplexed synchronization data from the component digital signal 111 to restore the horizontal and vertical synchronization signal 114. The luminance signal Y component and the two color difference signal Cb, Cr components are simultaneously separated, and the luminance signal 112 component and color difference signal 113 components are output at an 18-MHz clock rate.

The synchronization controller 109 generates the control signals required by the various parts of the recording apparatus according to the invention from the horizontal and vertical synchronization signal 114, and outputs these control signals to the respective components.

The channel/segment distributor 102 determines the channel and segment to which each pixel will be recorded for each sample of the luminance signal 112 and the color difference signals 113. This distribution method of the invention is described in detail below. The data is then output to two buses based on the channel allocations, i.e., channel 0 and channel 1 data 115 are output to one bus, and channel 2 and channel 3 data 116 are output to another bus. The data is divided and output to two buses to enable a single 18-MHz signal processing clock, and to keep the circuitry as small as possible. It is to be noted that the data on both buses (channel 0/1 bus and channel 2/3 bus) is processed identically thereafter, and that only the channel 0/1 bus is shown in FIG. 1 for simplicity.

The outer coding circuit 103 adds 8 check bytes to the 120 data bytes in both channels 0 and 1, forming four outer codes per line in each channel. The outer codes for channels 0 and 1 are alternately output to the demultiplexer 104.

The demultiplexer 104 separates the outer-coded 0/1 channel data 117 into the channel 0 data 118 and channel 1 data 119, and outputs the discrete channel data to separate buses. It is to be noted that the data on both buses (the channel 0 bus and channel 1 bus) is processed identically thereafter, and that only the channel 0 bus is shown in FIG. 1 for simplicity.

The field memory 105 forms the error correction matrices shown in FIGS. 9 and 10. The channel 0 data 118 is written in columns to the array formed by the field memory 105 based on the write address and write control signal 120 generated by the field memory controller 106. After the outer code for one field is written, data is read in row sequence from the field memory 105 based on the read address and read control signal 121 output from the field memory controller 106.

The read data 122 is output to the recording signal processor 107 for inner coding, multiplexing with the synchronization signal, digital recording modulation, parallel/serial conversion, and/or other processing to generate the recorded bit stream 123, which is output to the recording head 108 on the rotating cylinder 1 for recording to tape. The recording head 108 used herein is configured as shown in FIG. 3.

The method of the invention for distributing the signal samples to the recording channels and segments to enable effective error concealment no matter which of the eight recording or reproducing heads becomes defective is described below. Note that this is the method applied by the channel/segment distributor 102 of the recording apparatus described above and shown in FIG. 1.

The following naming conventions are used in the description below.

The number of recording channels is NCh where NCh=4 in the above recording apparatus.

The number of segments per field is NSeg; NSeg=3 in the 525/60 format, and NSeg=4 in the 625/50 format.

The number of valid lines per field is NLinFld; NLinFld= 255 in the 525/60 format, and NLinFld=304 in the 625/50 format.

The number of valid pixels per line is NSplLin; NSplLin= 960 pixels.

For the input digital component video signal, the valid line number in one field is lin where lin is an integer ranging from 0 to NLinFld-1; the valid pixel number in one line is pix where pix is an integer ranging from 0 to NSplLin-1.

As shown in FIG. 2, Yc, Cb, and Cr component samples are associated with pixels having an even pix value, and the Yi component sample is associated with pixels having an odd pix value. As a result, there are 480 valid samples of each Yc, Cb, Cr, and Yi component in each line. If each component sample comprises NSplSeg bytes in each segment of one recording channel, NSplSeg=480/4 channels/3 segments=40 bytes in the 525/60 format, and NSplSeg=480/4/4=30 bytes in the 625/50 format.

The Yc, Cb, Cr, Yi component samples from each pixel are first distributed to four outer codes, four recording channels, and three (525/60 format) or four (625/50 format) segments. The samples of the Yc, Cb, Cr, Yi components are evenly distributed to the three or four segments. This is to prevent biasing of the error data to any specific component even when all data in a specific segment is in error due to head clogging or some other cause. If the smallest segment distribution cycle is PSegDist, PSegDist=6 pixels in the 525/60 format and 8 pixels in the 625/50 format.

The pixels in one line are distributed at this PSegDist cycle, forming groups of 6 or 8 pixels. Specifically, $$grp=int(pix/PSegDist) \quad [1]$$

$$ph=pix \bmod PSegDist \quad [2]$$

If the cycle count per line is NGrpLin, NGrpLin= NSplLin/PSegDist, and NGrpLin=160 cycles or 120 cycles (525/60 or 625/50 format, respectively).

Note that grp is an integer ranging from 0 to NGrpLin-1, and ph is an integer ranging from 0 to PSegDist-1. The expression "x mod y" returns the remainder of x divided by y, and "int(x)" returns the greatest integer value not exceeding x. This convention is used throughout below.

The segment position in each cycle is determined as follows. Specifically, the Y, Cb, and Cr component samples or Yi component samples associated with pixel pix are distributed to segment seg where $$seg=segInit[ph] \quad [3]$$

However, segInit[ph] is the position of the segment of one cycle, and the segments are evenly distributed to each of the components. For example, if in the 525/60 format, segInit[0]=0 segInit[1]=1 segInit[2]=2 segInit[3]=0 segInit[4]=1 segInit[5]=2 \quad [4]

and in the 625/50 format, segInit[0]=0 segInit[1]=0 segInit[2]=1 segInit[3]=1 segInit[4]=2 segInit[5]=2 segInit[6]=3 segInit[7]=3 \quad [5]

all segments are distributed once each to both even numbered and odd numbered pixels. As a result, all segments are 10 distributed once each to the Y, Cb, and Cr component samples of the even numbered pixels, and to the Yi component samples of the odd numbered pixels. The number of component samples NSplSeg in each segment of each recording channel is therefore the same for each of the four components and is equal to NGrpLin/NCh. As described above, NSplSeg=40 samples in the 525/60 format, and NSplSeg=30 samples in the 625/50 format.

The next step is determining the recording channel distribution for each segment distribution cycle. As in the segment distribution method above, the position of the recording channel for one cycle is chInit[ph], and the Y, Cb, and Cr component samples or Yi component samples associated with pixel pix are distributed to that recording channel. The channel number is offset one or three channels each cycle, the recording channels can be evenly distributed for each component because the number of channels Nch=4. By also shifting the channel number each line, the recording channels to which same-position pixels in adjacent lines are recorded will differ. In other words, when the component samples of pixel pix are positioned in recording channel number ch, $$ch=(chInit[ph]+grpOfstCh*grp+linOfstCh*lin) \bmod Nch \quad [6]$$

where grpOfstCh is the channel number offset after each group and its value is 1 or 3, and linOfstCh is the channel number offset after each line and is an appropriate integer in the range between 0 and Nch-1.

For example, when segInit[ph] is the value obtained from either equation [4] or [5] and, and when grpOfsetCh=1, the appropriate chInit[ph] and linOfstCh values are shown in Tables 1 and 2 by way of example. The values in Table 1 are for the 625/50 format, and the values in Table 2 are for the 525/60 format. The use of the data in Tables 1, 2 and 3 will be described in detail later in connection with FIG. 12b.

TABLE 1

| | chInit [ph] | | | | | | | | |
|---|---|---|---|---|---|---|---|---|---|
| ph | 0 | 1 | 2 | 3 | 4 | 5 | 6 | 7 | linOfstCh |
| | 0 | 2 | 0 | 2 | 0 | 2 | 0 | 2 | 1 |
| | 0 | 2 | 0 | 2 | 0 | 2 | 0 | 2 | 3 |
| | 0 | 2 | 1 | 3 | 0 | 2 | 1 | 3 | 1 |
| | 0 | 2 | 1 | 3 | 0 | 2 | 1 | 3 | 3 |
| | 0 | 2 | 2 | 0 | 0 | 2 | 2 | 0 | 1 |
| | 0 | 2 | 2 | 0 | 0 | 2 | 2 | 0 | 3 |
| | 0 | 2 | 3 | 1 | 0 | 2 | 3 | 1 | 1 |
| | 0 | 2 | 3 | 1 | 0 | 2 | 3 | 1 | 3 |

(625/50 system, 4-segment 4-channel)

Data in Table 1 are obtained when segInit[ph]=0, 0, 1, 1, 2, 2, 3, 3 and grpOfstCh=1.

According to Table 1, for the 625/50 system with 4-segment and 4-channel arrangement, chInit[ph] can be generally expressed as follows:

0, 2, X1, X1+2, 0, 2, X1, (X1+2) in which X1 is any one of 0, 1, 2 and 3.

TABLE 2

| | chInit [ph] | | | | | | |
|---|---|---|---|---|---|---|---|
| ph | 0 | 1 | 2 | 3 | 4 | 5 | linOfstCh |
| | 0 | 0 | 2 | 0 | 0 | 3 | 1 |
| | 0 | 0 | 2 | 0 | 0 | 3 | 3 |
| | 0 | 0 | 2 | 0 | 1 | 3 | 1 |
| | 0 | 0 | 2 | 0 | 1 | 3 | 3 |
| | 0 | 0 | 2 | 0 | 2 | 3 | 1 |
| | 0 | 0 | 2 | 0 | 2 | 3 | 3 |
| | 0 | 0 | 2 | 0 | 3 | 3 | 1 |
| | 0 | 0 | 2 | 0 | 3 | 3 | 3 |
| | 0 | 1 | 2 | 0 | 0 | 3 | 1 |
| | 0 | 1 | 2 | 0 | 0 | 3 | 3 |
| | 0 | 1 | 2 | 0 | 1 | 3 | 1 |
| | 0 | 1 | 2 | 0 | 1 | 3 | 3 |
| | 0 | 1 | 2 | 0 | 2 | 3 | 1 |
| | 0 | 1 | 2 | 0 | 2 | 3 | 3 |
| | 0 | 1 | 2 | 0 | 3 | 3 | 1 |
| | 0 | 1 | 2 | 0 | 3 | 3 | 3 |
| | 0 | 2 | 2 | 0 | 0 | 3 | 1 |
| | 0 | 2 | 2 | 0 | 0 | 3 | 3 |
| | 0 | 2 | 2 | 0 | 1 | 3 | 1 |
| | 0 | 2 | 2 | 0 | 1 | 3 | 3 |
| | 0 | 2 | 2 | 0 | 2 | 3 | 1 |
| | 0 | 2 | 2 | 0 | 2 | 3 | 3 |
| | 0 | 2 | 2 | 0 | 3 | 3 | 1 |
| | 0 | 2 | 2 | 0 | 3 | 3 | 3 |
| | 0 | 3 | 2 | 0 | 0 | 3 | 1 |
| | 0 | 3 | 2 | 0 | 0 | 3 | 3 |
| | 0 | 3 | 2 | 0 | 1 | 3 | 1 |
| | 0 | 3 | 2 | 0 | 1 | 3 | 3 |
| | 0 | 3 | 2 | 0 | 2 | 3 | 1 |
| | 0 | 3 | 2 | 0 | 2 | 3 | 3 |
| | 0 | 3 | 2 | 0 | 3 | 3 | 1 |
| | 0 | 3 | 2 | 0 | 3 | 3 | 3 |

(525/60 system, 3-segment 4-channel)

Data in Table 2 are obtained when segInit[ph]=0, 1, 2, 0, 1, 2 and grpOfstCh=1.

According to Table 2, for the 525/60 system with 3-segment and 4-channel arrangement, chInit[ph] can be generally expressed as follows:

0, X1, 2, 0, X2, 3 in which each of X1 and X2 is any one of 0, 1, 2 and 3.

All samples in one line are distributed to the recording channel and segment determined as above, and the splSeg number is assigned in sequence to each component for each sample distributed to the same segment of the same recording channel. In other words, $$splSeg = grp/NCh \quad [7]$$

For example, when in the 525/60 format segInit[ph] is the value from equation [4], grpOfstCh is 1, and chInit[ph] is $chinit[0]=0$ $chinit[1]=3$ $chinit[2]=2$ $chinit[3]=0$ $chinit[4]=3$ $chinit[5]=3 \quad [8]$ the pix, grp, ph, ch, seg, and splSeg values are as shown in FIG. 5. When in the 625/50 format segInit[ph] is the value from equation [5], grpOfstCh is 1, and chInit[ph] is $chinit[0]=0$ $chinit[1]=2$ $chinit[2]=1$ $chinit[3]=3$ $chinit[4]=0$ $chinit[5]=2$ $chinit[6]=1$ $chinit[7]=3 \quad [9]$ the pix, grp, ph, ch, seg, and splSeg values are as shown in FIG. 6.

FIGS. 5 and 6 show the values of equations [1], [2], [3], [6], and [7] for pixel pix in the first four lines of the field. Which head each pixel is recorded/reproduced by is indicated in the row titled "head." In this row, 0a indicates the pixel is recorded by recording head r0a or reproduced by reproducing head p0a; 0b indicates the pixel is recorded by recording head r0b or reproduced by reproducing head p0b; 1a indicates the pixel is recorded by recording head r1a or reproduced by reproducing head p1a; 1b indicates the pixel is recorded by recording head r1b or reproduced by reproducing head p1b; 2a indicates the pixel is recorded by recording head r2a or reproduced by reproducing head p2a; 2b indicates the pixel is recorded by recording head r2b or reproduced by reproducing head p2b; 3a indicates the pixel is recorded by recording head r3a or reproduced by reproducing head p3a; 3b indicates the pixel is recorded by recording head r3b or reproduced by reproducing head p3b.

Referring to the even pix pixels in the 24 pixels from pix 0 to pix 23, defining one cycle, line by line in FIG. 5, it will be known that combinations of four channel numbers and three segment numbers repeat in each line. The same is true of just the odd pix pixels. This combination of channel numbers and segment numbers repeats on a 24 pixel cycle. In FIG. 6, combinations of four channel numbers and four segment numbers repeat in each line in a 32 pixel cycle. As a result, combinations of all channel numbers and all segment numbers are evenly allocated to the Yc, Cb, and Cr components of the even pix pixels, and to the Yi component of the odd pix pixels.

The head assignments for the Y component extracted from FIG. 5 (i.e., by reading the head line values) are shown in FIG. 7a, and the head assignments for the Cb and Cr components extracted from FIG. 5 (i.e., by reading the head line values for even pix values) are shown in FIG. 7b. As shown in FIG. 7a, all of the samples vertically, horizontally, or diagonally adjacent to the center sample are recorded/reproduced by a different head. The same is true in FIG. 7b. Examining the head distribution shown in FIG. 6 yields the same result.

Therefore, if there is a defect in one of the heads, the error pixel data, such as 0a's in FIG. 7a, produced by the defect head will not be located close to each other, but will be separated at least two pixel positions vertically and horizontally. Thus, the error pixel data will be scattered in the screen to make less eminent the error spots, which would otherwise be emphasized if the error spots are gathered. FIG. 8 shows a distribution pattern of Y, Cb, Cr components. Note that, unlike the prior art distribution pattern shown in FIG. 18, the distribution pattern of FIG. 8 has the same pixel components, such as 0a's, separated at least two pixel positions.

As thus described above, the head used to record each pixel is determined so that the recording channels and segments are evenly allocated to each of the Yc, Cb, Cr, and Yi components. The Yc, Cb, and Cr component samples from even numbered pixels at the same location are recorded/reproduced by the same head determined by the pixel number pix and line number lin, and the luminance signal component Y and color difference signal components Cb, Cr are distributed so that the pixel data of adjacent on-screen sampling points are recorded/reproduced by different heads. As a result, the number of error pixels on the screen is reduced when head clogging occurs, and the error pixels can be concealed using the adjacent on-screen pixel data.

It is to be noted that the values shown in equations [4] and [5] and Tables 1 and 2 are shown by way of example only, and other applicable values also exist.

For example, the same effect can be obtained in the 525/60 format using the values segInit[0]=0 segInit[1]=2 segInit[2]=1 segInit[3]=0 segInit[4]=2 segInit[5]=1    [10]

grpOfstCh=1, and the chInit[ph] and linOfstCh values shown in the following Table 3.

TABLE 3

| ph | chInit [ph] | | | | | | linOfstCh |
|---|---|---|---|---|---|---|---|
|  | 0 | 1 | 2 | 3 | 4 | 5 |  |
|  | 0 | 2 | 1 | 1 | 3 | 0 | 1 |
|  | 0 | 2 | 2 | 1 | 3 | 0 | 1 |

(525/60 system, 3-segment 4-channel)

Data in Table 3 are obtained when segInit[ph]=0, 2, 1, 0, 2, 1 and grpOfstCh=1.

According to Table 3, for the 525/60 system with 3-segment and 4-channel arrangement, chInit[ph] can be generally expressed as follows:

0, 2, X1, 1, 3, 0 in which X1 is any one of 1 and 2.

The method of resequencing the pixel data within the same segment of the same recording channel is described below for sets of pixel data distributed to recording channels and segments as described above.

The following component numbers comp are assigned to distinguish the Yc, Cb, Cr, and Yi components. The Cb component number comp is 0, the Cr comp is 1, the Yc comp is 2, and the Yi comp is 3.

By distributing the pixel data to plural recording channels and segments, the Yc, Cb, Cr, Yi video samples are mapped to an address comprising line number lin (an integer ranging from 0 to NLinFld-1), recording channel ch (an integer ranging from 0 to Nch-1), segment number seg (an integer ranging from 0 to NSeg-1), and the sample number splSeg in the segment (an integer ranging from 0 to NSplSeg-1). In other words, all data is addressed by a combination of (comp, lin, ch, seg, and splSeg) values.

To record the data for pixels that are adjacent on screen as far apart as possible on the tape, a data resequencing process called "shuffling" is used. To maintain the recording channel and segment assignments already determined for each pixel, the sequence of NSplSeg bytes of data having the same address (comp, lin, ch, seg) is shuffled within that segment. This is called "intra-segment shuffling" below.

In intra-segment shuffling, the following equation is applied to the existing address (comp, lin, ch, seg, splSeg) to obtain the resequenced address (comp, lin, ch, seg, splOCSeg). When comp=0, 1, or 2 (i.e., for Yc, Cb, or Cr component data), $$\text{splOCSeg}=(\text{baseFactor}*\text{splSeg}+\text{chOfst[ch]}+\text{segOfst[seg]}+ \text{linOfst}*\text{lin}) \bmod \text{NSplSeg} \quad [11]$$

and when comp=3 (i.e., for Yi component data), $$\text{splOCSeg}=(\text{baseFactor}*\text{splSeg}+\text{chOfst[ch]}+\text{segOfst[seg]}+ \text{linOfst}*\text{lin}+\text{compOfst}) \bmod \text{NSplSeg} \quad [12]$$

where baseFactor is a constant of 1 or a mutually prime integer of NSplSeg ranging from 1 to NSplSeg-1, chOfst[ch] is an array of integer constants from 0 to NSplSeg-1 and is applied to each ch value, segOfst[seg] is an array of integer constants from 0 to NSplSeg-1 and is applied to each seg value, linOfst is an integer constant from 0 to NSplSeg-1, and compOfst is an integer constant from 0 to NSplSeg-1.

A 1:1 mapping from splSeg to splOCSeg is defined by equations [11] and [12]. The baseFactor determines how far apart two samples, of which the splSeg value differs by just one, are after resequencing. chOfst[ch] and segOfst[seg] determine the mutual offset between the segments of each recording channel placed lengthwise along the tape (see FIG. 4). linOfst determines how far apart the pixel data of adjacent on-screen lines and recorded to the same segment of the same recording channel is recorded to tape. CompOfst determines the on-tape offset in the track direction between the data for the Yi component pixels and the data for pixels sampled for Yc, Cb, and Cr components.

Preferred values for the constants used in equations [11] and [12] are shown by way of example only in Tables 4 and 5 for the 525/60 format and 625/50 format, respectively.

TABLE 4

| base-Factor | segOfst [seg] | | | chOfst [ch] | | | | linOfst | comp-Ofst | comp-Ofst' |
|---|---|---|---|---|---|---|---|---|---|---|
| | 0 | 1 | 2 | 0 | 1 | 2 | 3 | | | |
| 1  | 0 | 14 | 8  | 0 | 20 | 0 | 20 | 1  | 19 | 19 |
| 1  | 0 | 14 | 8  | 0 | 20 | 0 | 20 | 39 | 19 | 19 |
| 1  | 0 | 33 | 26 | 0 | 20 | 0 | 20 | 4  | 34 | 34 |
| 1  | 0 | 33 | 26 | 0 | 20 | 0 | 20 | 4  | 35 | 35 |
| 1  | 0 | 33 | 26 | 0 | 20 | 0 | 20 | 37 | 34 | 34 |
| 1  | 0 | 33 | 26 | 0 | 20 | 0 | 20 | 37 | 35 | 35 |
| 39 | 0 | 7  | 14 | 0 | 20 | 0 | 20 | 4  | 5  | 35 |
| 39 | 0 | 7  | 14 | 0 | 20 | 0 | 20 | 4  | 6  | 34 |
| 39 | 0 | 7  | 14 | 0 | 20 | 0 | 20 | 37 | 5  | 35 |
| 39 | 0 | 7  | 14 | 0 | 20 | 0 | 20 | 37 | 6  | 34 |
| 39 | 0 | 26 | 32 | 0 | 20 | 0 | 20 | 1  | 21 | 19 |
| 39 | 0 | 26 | 32 | 0 | 20 | 0 | 20 | 39 | 21 | 19 |

(525/60 SYSTEM)

TABLE 5

| bace Factor | segOfst [seg] | | | | chOfst [ch] | | | | lin-Ofst | comp-Ofst | comp-Ofst' |
|---|---|---|---|---|---|---|---|---|---|---|---|
| | 0 | 1 | 2 | 3 | 0 | 1 | 2 | 3 | | | |
| 1  | 0 | 4  | 8  | 12 | 0 | 15 | 0 | 15 | 10 | 9  | 9  |
| 1  | 0 | 4  | 8  | 12 | 0 | 15 | 0 | 15 | 20 | 9  | 9  |
| 1  | 0 | 26 | 23 | 19 | 0 | 15 | 0 | 15 | 10 | 21 | 21 |
| 1  | 0 | 26 | 23 | 19 | 0 | 15 | 0 | 15 | 20 | 21 | 21 |
| 7  | 0 | 4  | 8  | 16 | 0 | 15 | 0 | 15 | 15 | 22 | 16 |
| 7  | 0 | 4  | 8  | 16 | 0 | 15 | 0 | 15 | 16 | 22 | 16 |
| 11 | 0 | 21 | 12 | 3  | 0 | 15 | 0 | 15 | 15 | 18 | 18 |
| 11 | 0 | 21 | 12 | 3  | 0 | 15 | 0 | 15 | 16 | 18 | 18 |
| 39 | 0 | 9  | 18 | 27 | 0 | 15 | 0 | 15 | 15 | 12 | 18 |
| 39 | 0 | 9  | 18 | 27 | 0 | 15 | 0 | 15 | 16 | 12 | 18 |
| 23 | 0 | 26 | 22 | 18 | 0 | 15 | 0 | 15 | 15 | 8  | 16 |
| 23 | 0 | 26 | 22 | 18 | 0 | 15 | 0 | 15 | 16 | 8  | 16 |

(625/50 SYSTEM)

By applying this intra-segment shuffling, all data is addressed by a combination of (comp, lin, ch, seg, splOCSeg) values. For the Yc, Cb, Cr component data associated with pixels at the same position, equation [11] is applied for intra-segment shuffling to retain the same address splOCSeg, and is recorded to an adjacent position on magnetic tape as will be described below. Yi samples with the same address splSeg as the Yc sample are adjacent to the Yc pixel on screen, but the splOCSeg value is different from that of equation [11] because of the compOfst constant used in equation [12]. As a result, the Yi sample is recorded on magnetic tape to a position sufficiently separated from the Yc sample data.

As described above, the data for the Yc, Cb, Cr, and Yi components assigned to the same recording channel in one line is encoded with a discrete outer code in segment number sequence. In other words, of each video sample addressed by a combination of (comp, lin, ch, seg, splOCSeg) values, the 120 samples with the same (comp, lin, ch) values are the video data and are outer coded as described above. Each outer code forms a column in FIG. 9 or FIG. 10, and each column is divided into three (525/60 format) or four (625/50 format) segments as described above. This operation can be expressed by the following equation.

$$\text{row} = \text{NSplSeg} * \text{seg} + \text{splOCSeg} \quad [13]$$

where row is the row address in the arrays shown in FIGS. 9 and 10.

In the horizontal direction, of the four outer codes of the same line, the outer code of the Yc component data is written to one column, the outer code of the Cb component data is written to the column next to the Yc component data column, the outer code of the Cr component data is written to the column next to the Cb component data column, and the outer code of the Yi component data is written to the column next to the Cr component data column. As a result, the four outer codes for the same line are written to the same line in four successive columns.

As a result, four data for which the splOCSeg value of the four outer codes of the same line are identical are positioned side by side in the field memory. In other words, by applying equations [11] and [12], the Yc, Cb, Cr component samples from the same pixel are written to the same row in adjacent columns, and the Yi component sample from the on-screen pixel adjacent to the Yc, Cb, Cr component sample pixel is written to the next column but to a different row. In addition, the Yc, Cb, Cr component samples from similarly adjacent on-screen pixels are written to different rows in the same column.

Because data read horizontally from the field memory is recorded to tape, and the data for the Yc, Cb, and Cr samples of the same pixel are written to the same row of adjacent columns, the Yc, Cb, and Cr sample data are read sequentially from the field memory and recorded continuously to tape. In addition, because the Yi component data or the Yc, Cb, and Cr component data of adjacent on-screen pixels are read from a different row, the data for adjacent pixels are written to different (nonadjacent) tape positions. As a result, the Yc, Cb, and Cr data for the same pixel are recorded to adjacent positions on tape, but the Yi component data or the Yc, Cb, and Cr component data of adjacent on-screen pixels are read from different (nonadjacent) tape positions.

Therefore, by applying the method of the invention as described above, even if successive errors occur in the same track, the data for the pixels adjacent to the error pixel are recorded to nonadjacent positions in the same track. This increases the probability that the adjacent pixel data will not be in error, and makes more effective data concealment possible.

The channel/segment distributor 102 implementing the above method in a recording apparatus is described below. A block diagram of the channel/segment distributor 102 is shown in FIG. 11.

Referring to FIG. 11, the color difference signals 113 and luminance signal 112 are input from the respective input terminals 1301 and 1302 to the line memories 1303 and 1304. The line memories 1303 and 1304 store the color difference signal samples and luminance signal samples, respectively, for one line period. The write address generator 1306 generates the write addresses 1311, 1312 for the line memories 1303 and 1304, and the read address generator 1307 similarly generates the read addresses 1313 and 1314. The selector circuit 1308 selects the read or write operations of the line memories 1303 and 1304. The switching circuit 1305 switches between the color difference signal samples 1315 and the luminance signal samples 1316 as controlled by the switching control signal 1317 to obtain the channel 0 and channel 1 data 115 and the channel 2 and channel 3 data 116. The channel 0 and channel 1 data 115 is then output through output terminal 1309, and the channel 2 and channel 3 data 116 through output terminal 1310.

Figure 12A:
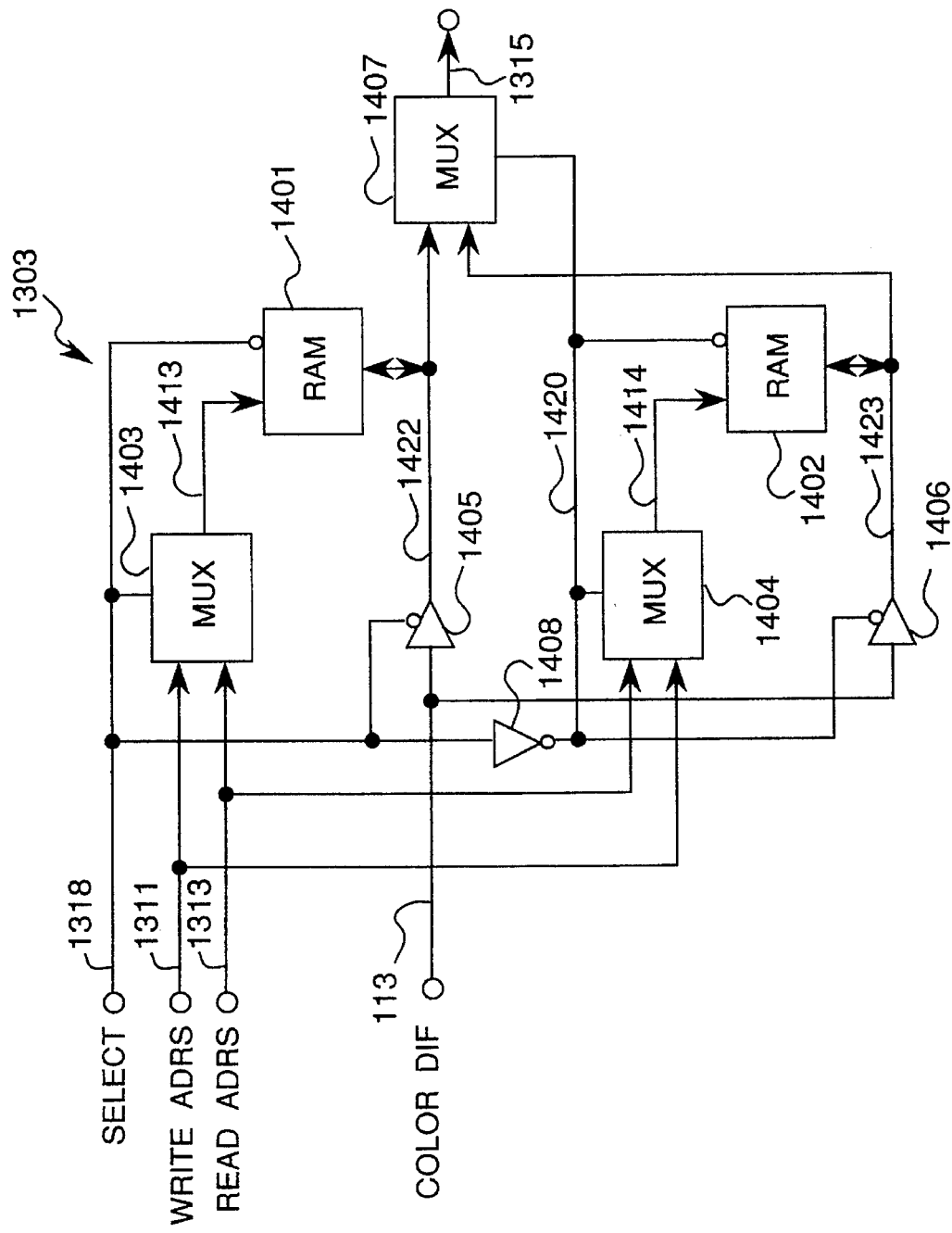
FIG. 12a is a block diagram showing a detail of the line memory shown in FIG. 11.

Referring to FIG. 12a, a detail of the line memory 1303 for storing color difference signals is shown. The two RAM modules 1401, 1402 each have sufficient capacity to store the color difference signal samples for one line. The respective access addresses 1413, 1414 for the RAM modules 1401, 1402 are supplied from the corresponding multiplexer 1403 or 1404. The multiplexers 1403, 1404 supply either the write address 1311 or the read address 1313 to the respective RAM module 1401 or 1402 based, respectively, on the selector signal 1318 or the selector signal 1420 obtained by inversion of the selector signal 1318 by the inverter 1408.

In other words, when the selector signal 1318 is 0, the multiplexer 1403 outputs the write address 1311 as the address 1413 for RAM 1401, and the other multiplexer 1404 outputs the read address 1313 as the address 1414 for RAM 1402. By the selector signal 1318 enabling the buffer 1405, the write data, which is the color difference signal 113 is supplied to RAM 1401. Because the other buffer 1406 is disabled at this time by the selector signal 1420, the color difference signal 113 is not supplied to the other RAM 1402. By inputting a write enable signal as the selector signal 1318 to the RAM 1401, the write data supplied to the data bus 1422 is written to the RAM 1401. The selector signal 1420 also sets the other RAM 1402 to a write disabled state, and the read data from the RAM 1402 is output to the data bus 1423. The multiplexer 1407 selects this read data according to the selector signal 1420, and outputs the color difference signal samples 1315.

When the selector signal 1318 is 1, the selector signal 1420 is 0. Thus, the one multiplexer 1403 selects the read address 1313 and the other multiplexer 1404 selects the write address 1311, thus disabling buffer 1405 and enabling buffer 1406. The color difference signal 113 is therefore written to RAM 1402 and the data read from RAM 1401 is selected by the multiplexer 1407 and output as the color difference signal samples 1315.

The RAM modules 1401, 1402 thus invert the selector signal 1318 every line, causing the color difference signal 113 to be written every other line to alternate RAM modules 1401, 1402 based on the write address 1311, and causing the data stored for the previous line to be read every other line from alternate RAM modules 1401, 1402 based on the read address 1313. As a result, the continuously input data is output after a one line delay.

The line memory 1304 has a structure similar to the structure of the line memory 1303 shown in FIG. 12a. The difference is that, instead of the color difference signals 113, the luminance signal sample 112 is supplied as the write data; instead of the line memory write address 1311 as the write address, the line memory write address 1312 is supplied as the write address; and instead of the line memory read address 1313, the line memory read address 1314 is supplied as the read address. The same selector signal 1318 is used in both line memories 1303 and 1304.

Figure 12B:
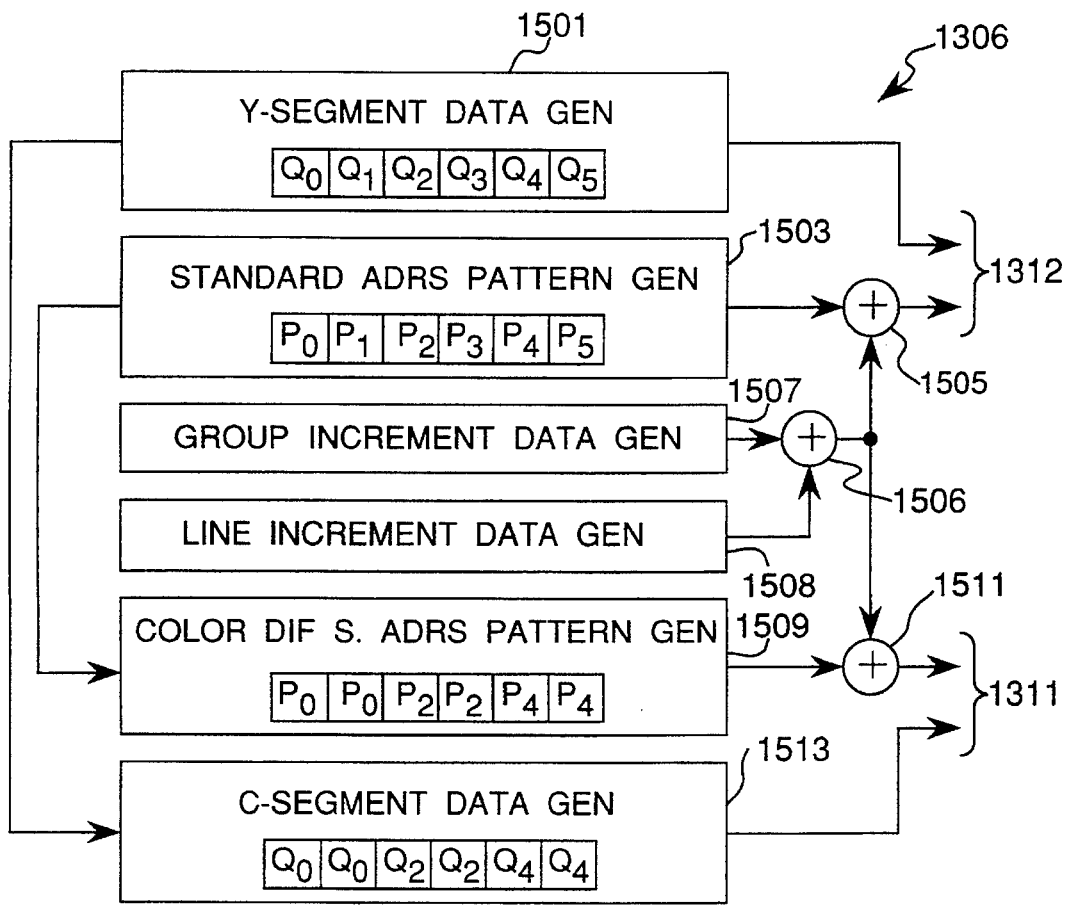
FIG. 12b is a block diagram showing a detail of the write address generator shown in FIG. 11.

Referring to FIG. 12b, a detail of the write address generator 1306 is shown. The write address generator 1306 has a luminance signal segment data generator 1501 for producing segment position data in one cycle according to equation [4] or [5], a standard address pattern generator 1503 for producing a preselected standard address pattern in one cycle according to Table 1, 2 or 3, a group increment data generator 1507 for producing a group increment data according to grpOfstCh given in equation [6], a line increment data generator 1508 for producing a line increment data according to linOfstCh given in Table 1, 2 or 3, a color difference signal address pattern generator 1509 for producing an address pattern modified from the preselected standard address pattern obtained from the standard address pattern generator 1503, a color difference signal segment data generator 1513 for producing segment position data modified from the segment position data obtained from the luminance signal segment data generator 1501, and adders 1505 and 1511.

In the case of 525/60 NTSC system with 3-segment and 4-channel arrangement, the following arrangement is taken.

The luminance signal segment data generator 1501 has six cells for storing six segInit[ph] data Q0–Q5 given in equation [4]. In this case, (Q0, Q1, Q2, Q3, Q4, Q5) is equal to (0, 1, 2, 0, 1, 2).

Similarly, the standard address pattern generator 1503 has six cells for storing six preselected chInit[ph] data P0–P5 as a standard address pattern, which is selected from Table 2. According to one example, data obtained by equation [8], i.e., data from a penultimate row in Table 2 is selected, so that (P0, P1, P2, P3, P4, P5) is equal to (0, 3, 2, 0, 3, 3), which defines one group. Any other data in Table 2 can be selected as the six preselected chInit[ph] data P0–P5.

According to this example, it is so selected that grpOfstCh=1. Thus, for the first group of six components, address data (0, 3, 2, 0, 3, 3) is produced from the adder 1505. For the second group of six components, the group increment data generator 1507 produces grpOfstCh=1 so that address data (0+grpOfstCh, 3+grpOfstCh, 2+grpOfstCh, 0+grpOfstCh, 3+grpOfstCh, 3+grpOfstCh)=(0+1, 3+1, 2+1, 0+1, 3+1, 3+1)=(1, 0, 3, 1, 0, 0) is produced from adder 1505. Note that since there are four channels, a number after 3 is 0. For the third group of six components, address data (0+grpOfstCh·2, 3+grpOfstCh·2, 2+grpOfstCh·2, 0+grpOfstCh·2, 3+grpOfstCh·2, 3+grpOfstCh·2)=(2, 1, 0, 2, 1, 1) is produced, provided that grpOfstCh·2=2. For the fourth group of six components, address data (0+grpOfstCh·3, 3+grpOfstCh·3, 2+grpOfstCh·3, 0+grpOfstCh·3, 3+grpOfstCh·3, 3+grpOfstCh·3)=(3, 2, 1, 3, 2, 2) is produced, provided that grpOfstCh·3=3. In this manner, the group increment data {(grpOfstCh·grp) mod 4} changes 0, 1, 2, 3, 0, 1, 2, 3, ... with an increment of 1 after every group, i.e, six component addresses. In other words, after every six component addresses are produced from adder 1505, the address data of the next six components are incremented by the group increment data grpOfstCh. In the above example, six components are included in one group, but in the example shown in Table 1, eight components are included in one group.

Also according to this example, from a penultimate row in Table 2, linOfstCh=1 is obtained. Thus, the line increment data generator 1508 sequentially produces 0, 1, 2, 3, 0, 1, 2, 3, 0, 1, 2, 3, ... Thus, for the first line, linOfstCh·0=0 is added to the grpOfstCh·grp at adder 1506 so that the address data described in the above paragraph are produced as they are. For the second line, one is added to the grpOfstCh·grp at adder 1506. Thus, for the first group of six components in the second line, address data (0+linOfstCh, 3+linOfstCh, 2+linOfstCh, 0+linOfstCh, 3+linOfstCh, 3+linOfstCh)=(1, 0, 3, 1, 0, 0) is produced from the adder 1505. For the second group of six components in the second line, the group increment data generator 1507 produces grpOfstCh·1=1 and, at the same time, the line increment data generator 1508 produces linOfstCh·1=1. Thus, the address data (0+grpOfstCh·1+linOfstCh·1, 3+grpOfstCh·1+linOfstCh·1, 2+grpOfstCh·1+linOfstCh·1, 0+grpOfstCh·1+linOfstCh·1, 3+grpOfstCh·1+linOfstCh·1, 3+grpOfstCh·1+linOfstCh·1)=(0+1+1, 3+1+1, 2+1+1, 0+1+1, 3+1+1, 3+1+1)=(2, 1, 0, 2, 1, 1) is produced from adder 1505. In this manner, the line increment data {(linOfstCh·lin) mod 4} changes 0, 1, 2, 3, 0, 1, 2, 3, ... with an increment of 1 after every line. In other words, after every line, the address data of the components in the next line are incremented by the line increment data linOfstCh.

Also, the color difference signal address pattern generator 1509 has six cells for storing modified chInit[ph] data such that every other chInit[ph] data from six preselected chInit [ph] data P0–P5 in the standard address pattern generator 1503 are taken and each chInit[ph] data is repeated twice. Thus, according to the above example, the color difference signal address pattern generator 1509 produces (P0, P0, P2, P2, P4, P4) which is equal to (0, 0, 2, 2, 3, 3).

Furthermore, the color difference signal segment data generator 1513 has six cells for storing modified segInit[ph] data such that every other segInit[ph] data from six segInit[ph] data Q0–Q5 in the luminance signal segment data generator 1501 are taken and each segInit[ph] data is repeated twice. Thus, according to the above example, color difference signal segment data generator 1513 produces (Q0, Q0, Q2, Q2, Q4, Q4) which is equal to (0, 0, 2, 2, 1, 1).

During the first cycle, the luminance signal segment data generator 1501 sequentially produces (0, 1, 2, 0, 1, 2), and adder 1505 sequentially produces (0, 3, 2, 0, 3, 3) which is equal to a sum of (0, 3, 2, 0, 3, 3) plus zero to each component. These signals are produced as write address 1312 to line memory 1304 for designating a storing area for storing luminance signals. In the same first cycle, the color difference signal segment data generator 1513 sequentially produces (0, 0, 2, 2, 1, 1), and adder 1511 sequentially produces (0, 0, 2, 2, 3, 3) which is equal to a sum of (0, 0, 2, 2, 3, 3) plus zero to each component. These signals are produced as write address 1311 to line memory 1303 for designating a storing area for storing color difference signals.

During the second cycle, the luminance signal segment data generator 1501 sequentially produces the same data (0, 1, 2, 0, 1, 2), and adder 1505 sequentially produces (1, 0, 3, 1, 0, 0) which is equal to a sum of (0, 3, 2, 0, 3, 3) plus one to each component. In the same second cycle, the color difference signal segment data generator 1513 sequentially produces the same data (0, 0, 2, 2, 1, 1), and adder 1511 sequentially produces (1, 1, 3, 3, 0, 0) which is equal to a sum of (0, 0, 2, 2, 3, 3) plus one to each component.

In FIG. 5, above one cycle operation is shown in a dotted line enclosed area, and four cycles are carried out as shown in a real line enclosed area to complete one grand cycle covering 24 pixels in which one rotation of different combinations of the channel number and segment number is completed.

Figure 13:
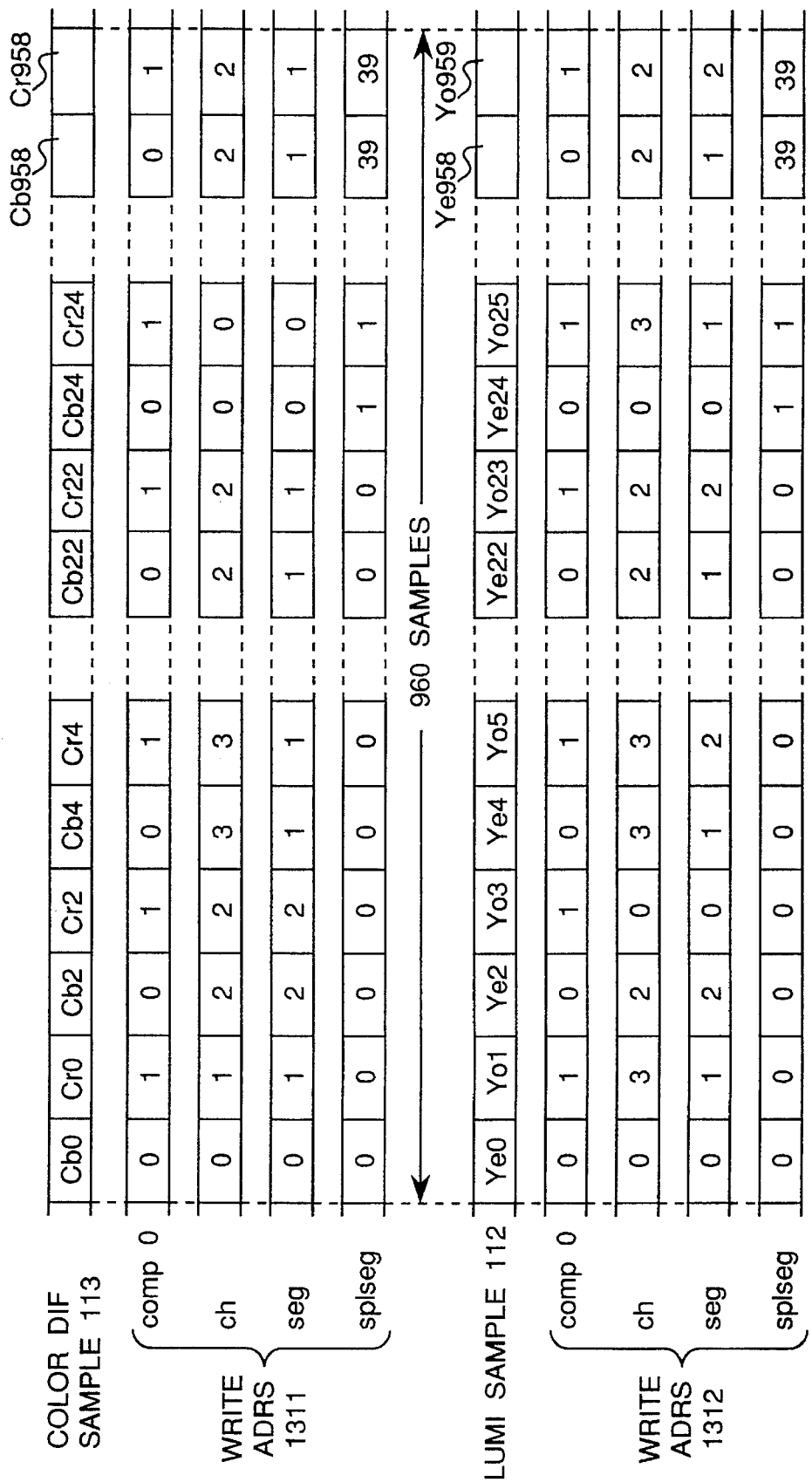
FIG. 13 is a timing chart of the line memory write operation in the preferred embodiment of the invention.

A timing chart of the write operation of the line memories 1303 and 1304 is shown in FIG. 13. As shown in the figure, the color difference signal sample 113 alternately inputs the Cb and Cr component samples. Note that in FIG. 13, Cbn and Crn indicate the sample of pixel n in one line. Because the color difference signal components are associated only with the even numbered pixels, n is always an even number. The write address 1311 comprises the seg, ch, and splSeg values shown in equations [3], [6], and [7], and comp0, which is the LSB of the component number comp.

As shown in the figure, the Yc and Yi luminance signal samples 112 are alternately input. Note that Ycn and Yin in FIG. 14 indicate the sample of pixel n in one line. Because the luminance signal samples are associated with both even and odd numbered pixels, n may be either an even or odd number when used in reference to the luminance signal samples. The write address 1312 comprises the seg, ch, and splSeg values shown in equations [3], [6], and [7], and comp0, which is the LSB of the component number comp.

The specific values shown in FIG. 13 correspond to line lin=0 in FIG. 5. For example, a total 960 samples, comprising all valid Cb and Cr samples in one line, are written successively to the addresses (comp0, ch, seg, splSeg) obtained by equations [3], [6], and [7] such that Cb0, which is the Cb component sample of pixel 0, is written to RAM address (comp0, ch, seg, splSeg)=(0, 0, 0, 0) in one of the two RAM modules comprising the line memory 1303.

As a result, one line of data is arrayed to the line memories 1303 and 1304 according to the recording channel and segment positions determined by the above method of the invention.

Note that the write address generator 1306 generating the above write address series can be easily achieved by means of a counter that is reset by the horizontal and vertical synchronization signals from the synchronization controller 109, and a decoder for decoding the counter output.

By reading the data stored to the line memories as described above by means of the method described below, the Yc, Cb, Cr component samples of the same pixel are recorded/reproduced by the same recording/reproducing head, and the pixel data for all adjacent sampling points is recorded/reproduced by different heads.

After storing all valid samples for one line period, the selector signal 1318 is inverted to switch the two RAM modules in the line memories 1303 and 1304 and read the stored samples for one line period. The read sequence used at this time increases sequentially from a splOCSeg=0 value as determined by equations [11] and [12]. Read address 1313 and read address 1314 are thus the (comp0, ch, seg, splSeg) values obtained by the following equations, which are inverse functions of equations [11] and [12].

$$splSeg=(baseFactor'*splOCSeg-chOfst'[ch]-segOfst'[seg]-linOfst'*lin) \bmod NSplSeg. \qquad [14]$$

When comp=3 (for the Yi component data), $$splSeg=(baseFactor'*splOCSeg-chOfst'[ch]-segOfst'[seg]-linOfst'*lin-compOfst') \bmod NSplSeg \qquad [15]$$

and baseFactor' is the smallest value whereby $$baseFactor*baseFactor' \bmod NsplSeg=1 \qquad [16]$$

is true, and $$chOfst'[ch]=chOfst[ch]*baseFactor' \bmod NSplSeg$$

$$segOfst'[seg]=segOfst[seg]*baseFactor' \bmod NSplSeg$$

$$linOfst'=linOfst*baseFactor' \bmod NSplSeg$$

$$compOfst'=compOfst*baseFactor' \bmod NSplSeg. \qquad [17]$$

Figure 14:
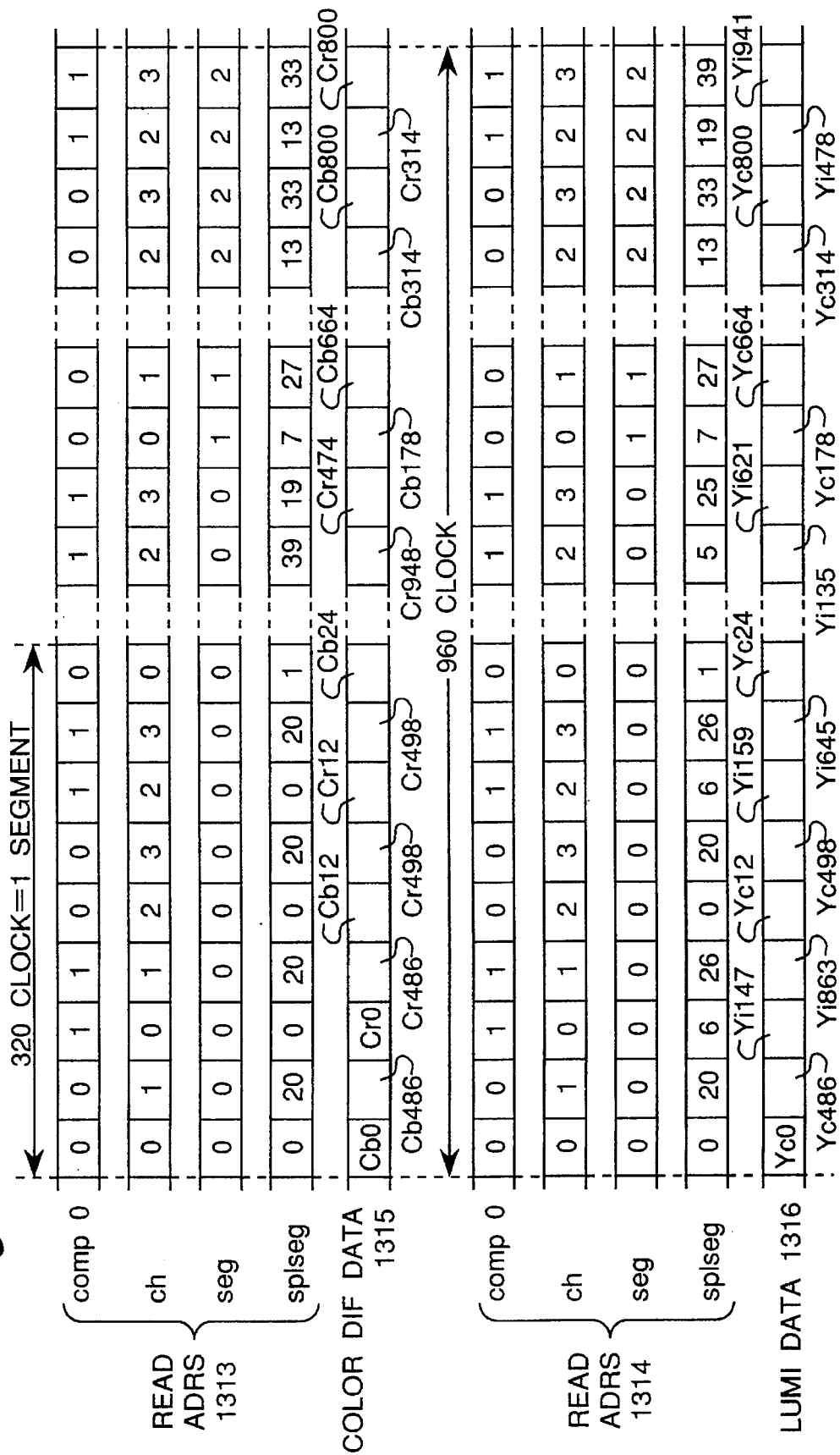
FIG. 14 is a timing chart of the line memory read operation in the preferred embodiment of the invention.

This read address is illustrated in FIG. 14. As shown in the figure, segment 0 is read in the ch sequence 0,1,0,1,2,3,2,3 ... in comp0 sequence 0,0,1,1 ..., and is followed by reading segment 1 and then segment 2. The color difference signal samples 1315 and luminance signal samples 1316 obtained by this read operation are in the sequence Cb, Cb, Cr, Cr, and Yc, Yc, Yi, Yi, respectively, and the sample sequence differs from that of the original sequence due to intra-segment shuffling as described above.

The read address generator 1307 generating the above read address series can be easily achieved by means of a counter that is reset by the horizontal and vertical synchronization signals from the synchronization controller 109, a decoder for decoding the counter output, and a simple operating circuit.

Figure 12C:
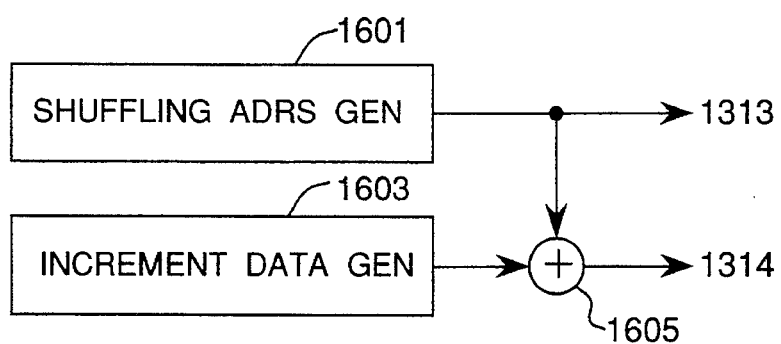
FIG. 12c is a block diagram showing a detail of the read address generator shown in FIG. 11.

Referring to FIG. 12c, a detail of the read address generator 1307 is shown. The read address generator 1307 has a shuffling address generator 1601, an increment data generator 1603 and an adder 1605. The address data generated from the shuffling address generator 1601 is produced as the read address 1313 for reading color difference signals Cb, Cb, Cr, Cr in said order from line memory 1303, and the address data generated from the adder 1605 is produced as the read address 1314 for reading luminance signals Yc, Yc, Yi, Yi in said order from line memory 1304. Since according to the present invention, a predetermined distance compOfst', which is given in Tables 4 and 5, is added to an address for designating the luminance signal Yi by the adder 1605 so that when it comes to read Yi from the line memory 1304, the luminance signal Yi located the predetermined distance compOfst' away from a position where the color difference signal Cr is located in the corresponding line memory 1303, is read. Thus, in the above example, since the predetermined distance compOfst' is 34, the increment data generator 1603 produces 0, 0, 34, 34 repeatedly to add 34 at adder 1605 when it comes to produce the address for reading the luminance signal Yi.

The shuffling address generator 1601 produces address data according to equation [14]. According to the present invention, the shuffling pattern is the same among the color difference signals Cb, Cr and the luminance signal Yc, but the shuffling pattern for the luminance signal Yi is different from that of other signals Cb, Cr and Yc.

The selector signal 1318 is generated by the selector circuit 1308, and is 0 or 1 on alternating lines. Selector circuit 1308, write address generator 1306, and read address generator 1307 operation are synchronized to the input video signal according to the control signal (not shown in the figures) output from the synchronization controller 109 (FIG. 1).

It is to be noted that the following values are in the examples shown in FIGS. 13 and 14.

baseFactor=1 chOfst[0]=0 chOfst[1]=20 chOfst[2]=0 chOfst[3]=20 segOfst[0]=0 segOfst[1]=33 segOfst[2]=26 linOfst=4 compOfst=34. [18]

Figure 15:
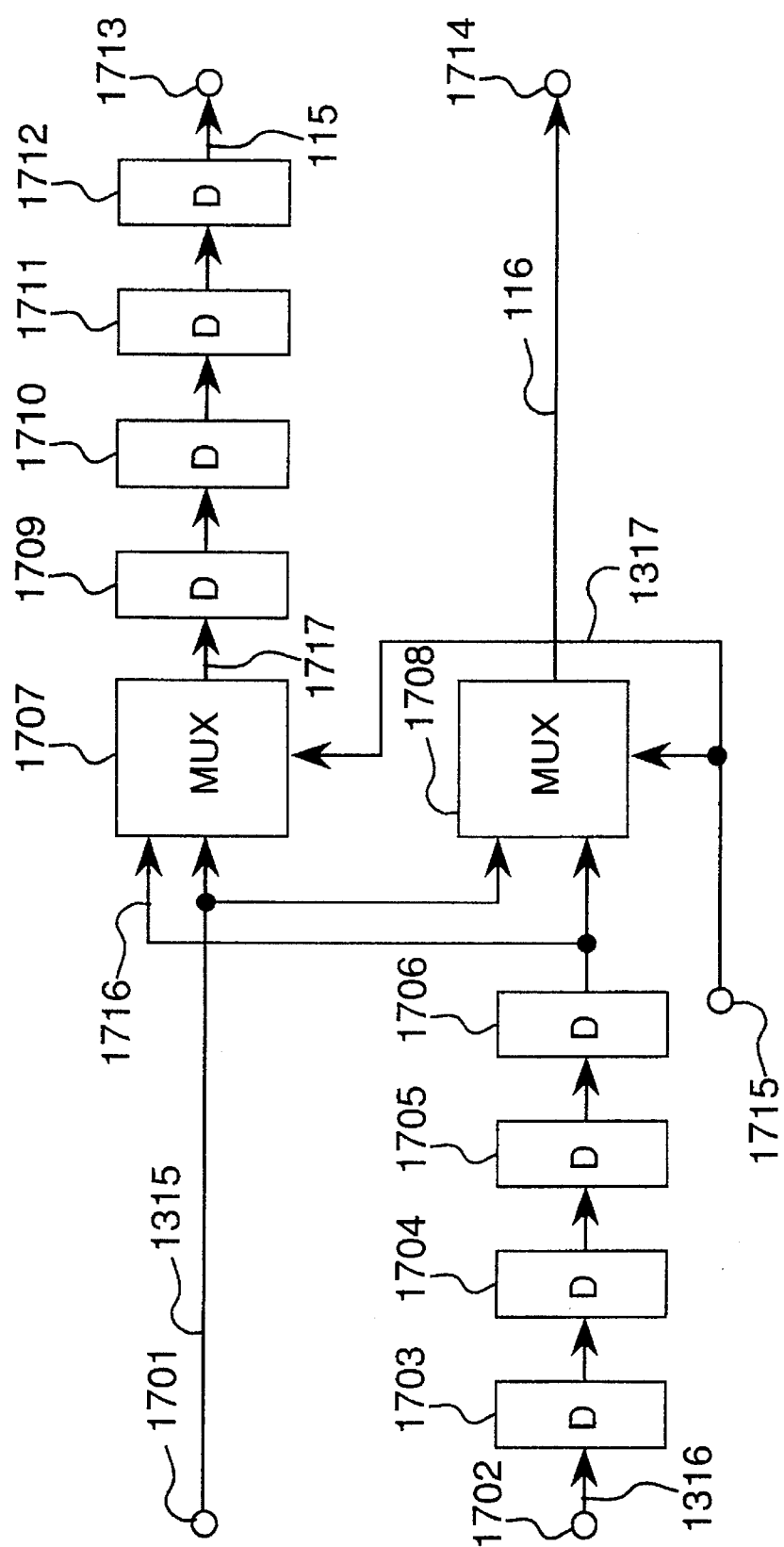
FIG. 15 is a block diagram of the switching circuit in the preferred embodiment of the invention.

After shuffling, the switching circuit 1305 allocates the color difference signal samples 1315 and the luminance signal data 1316 to channels 0 and 1 and channels 2 and 3. A detailed block diagram of the switching circuit 1305 is shown in FIG. 15.

Figure 16:
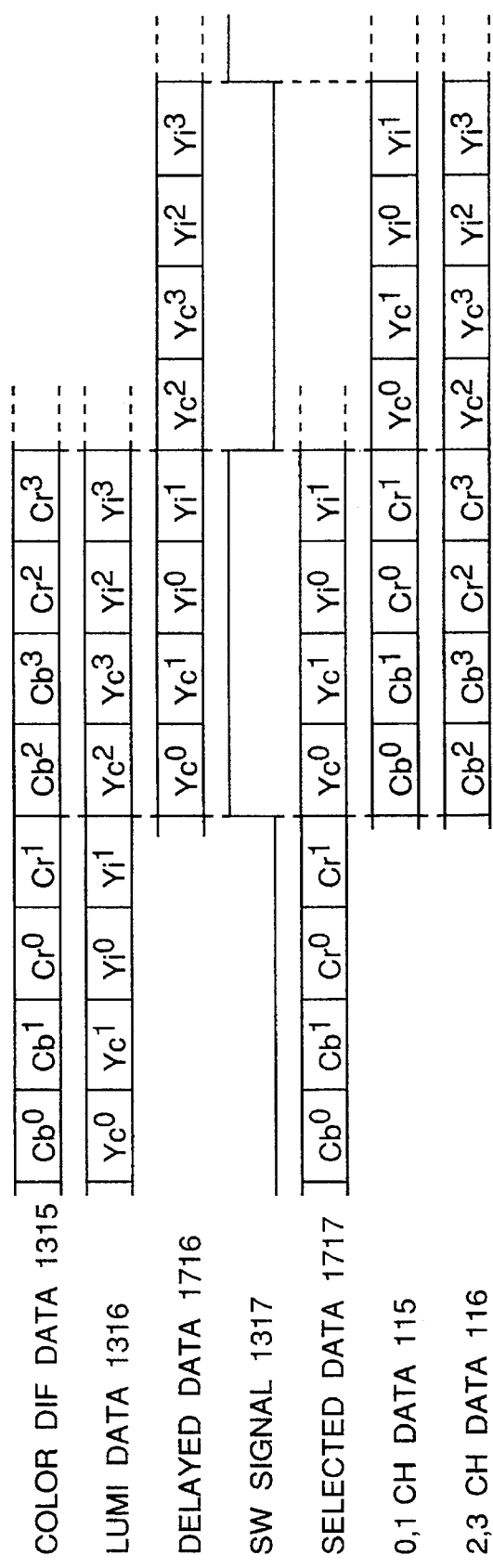
FIG. 16 is a timing chart of switching circuit operation in the preferred embodiment of the invention.
Figure 17:
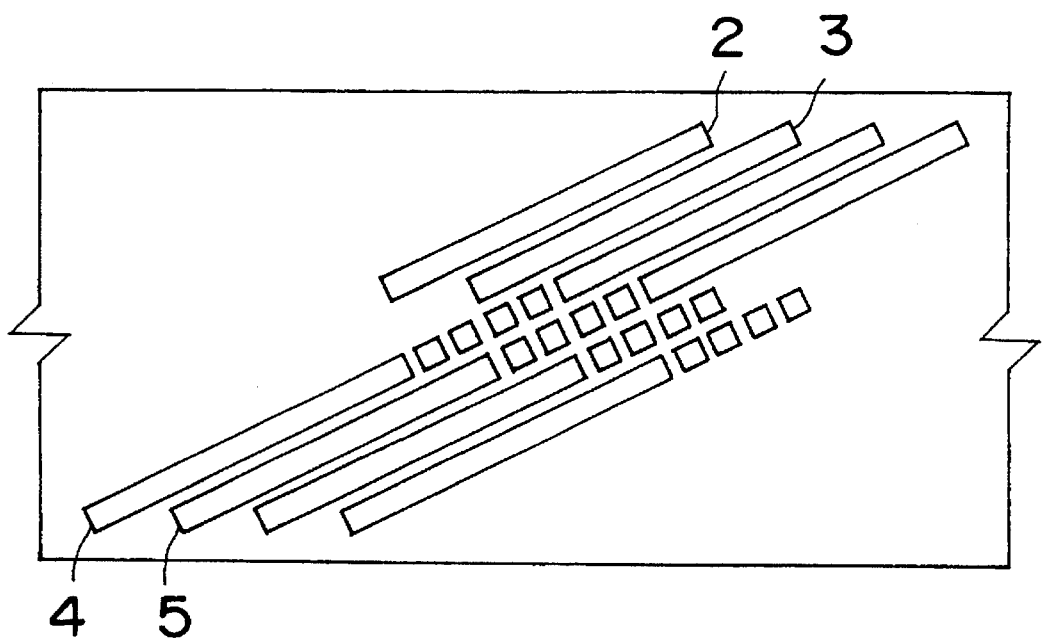
FIG. 17 is a diagram illustrating the tape pattern of the conventional recording method.

The color difference (Cb, Cr) signal samples 1315 read from the line memory 1303 are input from terminal 1701, and the luminance signal (Yc, Yi) samples 1316 read from the other line memory 1304 is input from terminal 1702. As shown in FIGS. 14 and 16, the data is read from channel numbers 0, 1, 0, 1, 2, 3, 2, 3 at an 8-clock cycle (the superscript value to the Yc, Yi, Cb, and Cr codes in FIG. 16 indicates the channel number). The data 1316 is delayed four clocks by D flip-flops 1703–1706, resulting in delayed data 1716. As a result, the color difference signal samples 1315 and the delayed data 1716 are not input to the multiplexer at the same clock count. The multiplexer 1707 selects only the channel 0 and channel 1 data from the input data 1315 and the delayed data 1716, and outputs the selected data as the channel 0/1 data 1717. The other multiplexer 1708 selects only the channel 2 and channel 3 data from the input data

1315 and the delayed data 1716, and outputs the selected data as the channel 2 and channel 3 data 116. As a result, the switching control signal 1317 input from the terminal 1715 can be inverted every four clock counts as shown in FIG. 16. This inverted signal 1317 is supplied from the read address generator 1307 as shown in FIG. 11. The channel 0/1 data 1717 is delayed 4 clock counts by D flip-flops 1709–1712, and is output as the channel 0 and channel 1 data 115 at the same timing as the channel 2 and channel 3 data 116.

The channel 0 and channel 1 data 115, which is obtained in the same way, is sequenced with the channel 0 data alternating with the channel 1 data, the sample data within each channel sequenced in Cb, Cr, Yc, Yi component order, and the different components sequenced in the outer code order. The outer coding circuit 103 outer codes each component in each channel in the channel 0 and channel 1 data 115. The same operation is applied to the channel 2 and channel 3 data 116.

The outer-coded 0/1 channel data 117 is similarly arranged with the channel 0 and channel 1 data in alternating sequence. The demultiplexer 104 separates the outer-coded 0/1 channel data 117 into alternating channel 0 data 118 and channel 1 data 119 to generate separate error correction arrays for each channel.

The write address control signal 120 of the field memory 105 comprising the two-dimensional arrays shown in FIGS. 9 and 10 is generated by the field memory controller 106. As described with reference to FIGS. 9 and 10 above, the channel 0 data 118 in Cb, Cr, Yc, Yi sequence is written to the same row across four consecutive columns in the sequence Yc, Cb, Cr, Yi.

The outer coded data 118 is thus successively written to complete the arrays shown in FIGS. 9 and 10 when all data for one field has been written.

The read control signal 121 of the field memory 105 is generated by the field memory controller 106, and includes the row and column address of the array shown in FIGS. 9 and 10. The field data is then read from each channel based on the read control signal 121.

In a digital video recording apparatus according to the preferred embodiment of the invention thus described, the digital video recording method of the invention can be achieved using the channel/segment distributor 102 and the field memory 105, the Yc, Cb, Cr component sample data for the same pixel can be recorded by the same recording head, the sample data for adjacent on-screen pixels can be recorded to a nonadjacent position on the tape, and the quality of the reproduced image can be improved when data errors are detected.

It is to be noted that the read sequence from the field memory 105 can be modified as follows.

If when data is read from the field memory 105 the data is read from the same field memory address in each field, the head recording/reproducing each segment changes between side a and side b every field because there are three segments/field in the 525/60 format. For example, if data is read starting from point D (FIG. 9) in each field, the first 40 rows (seg=0) in the first field are read by the side-a heads, the next 40 rows (seg=1) are read by the side-b heads, and the last 40 rows (seg=2) are read by the side-a heads. In the next field, the first 40 rows (seg=0) are read by the side-b heads, the next 40 rows (seg =1) are read by the side-a heads, and the last 40 rows (seg=2) are read by the side-b heads. Thus, the heads recording/reproducing each segment change each field. If head clogging then occurs in one of the side-a heads, the error pixels allocated to the clogged head and the pixels with the same address in the field memory will be assigned to the side-b head in the next field. As a result, the data stored to that address will be refreshed every other field during data reproduction.

Because there are four segments per field in the 625/50 format, if reading starts from the same field memory address every field, the heads used to record/reproduce each segment will not change. If one side-a head clogs in this case, the error pixels allocated to the clogged head and the pixels with the same address in the field memory will be assigned to the same head in the next field, and the data at that address will never be refreshed during data reproduction.

To correct this problem in the 625/50 format, the segment from which reading starts is shifted at the beginning of each field. For example, if the first field is read by reading the first track starting from point E to e and A to a, the next track is read from F to f and B to b, the third track from G to g and C to c, and the fourth track from H to h and D to d, the next field is read by shifting the starting point of the first field track to either F or H. As a result, the head used to record each segment can be changed each field as in the 525/60 format.

It is to be noted that the effect of the present invention can be obtained by switching the relationship between the segment number seg and the actual track to which the segment is recorded on tape. When this is done, the pixels recorded/reproduced by the defective head will be different in successive fields, the concealed pixels will differ in successive fields, and the field memory will be refreshed every other field during reproduction no matter which of the recording/reproducing heads becomes defective. The error pixel data is therefore replaced by the pixel data for the same pixel position in the previous field, and the reproduced image quality is improved.

As will be known from the above description, the luminance signal component sample and the two color difference signal component samples obtained from the same on-screen pixel position can be recorded using the same recording head while simultaneously recording the luminance signal component sample and the two color difference signal component samples obtained for adjacent on-screen sampling points (pixels) using mutually different recording heads. The luminance signal component and two color difference signal components sampled from two adjacent on-screen sampling points can also be recorded to mutually nonadjacent positions on the recording medium. As a result, errors occurring during data reproduction can be effectively concealed, and the quality of the reproduced image can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital video signal recording method for recording a video signal expressed by four digital components such that even numbered pixel is expressed by a first type luminance signal component and two color difference signal components, and odd numbered pixel is expressed by a second type luminance signal component, said method comprising the steps of:

(a) presenting four different channels through which said four digital components are stored;

(b) providing a predetermined number of segments for storing one field video signal;

(c) setting a standard channel order of a recurring channel pattern;

(d) aligning channels based on said standard channel such that a first group is the standard channel order, and following groups take such an order that the standard channel order is shifted, after each group, by a first predetermined increment amount, and also that the channel order in one line is shifted, after each line, by a second predetermined increment amount;

(e) allocating said first and second type luminance signal components with said aligned channels;

(f) assigning sequentially said predetermined number of segments to said first and second type luminance signal components;

(g) allocating said two color difference signal components with channels based on said aligned channels such that every other channel data from said aligned channels are taken and each channel data is repeated twice; and (h) assigning sequentially said predetermined number of segments to said two color difference signal components, whereby said first type luminance signal component and two color difference signal components for the even numbered pixel are stored in a same segment by the same channel.

2. A digital video signal recording method according to claim 1, wherein said predetermined number of segments in step (b) is three segments comprising a first segment, a second segment and a third segment aligned in said order.

3. A digital video signal recording method according to claim 2, wherein said recurring channel pattern in step (c) includes six channels.

4. A digital video signal recording method according to claim 3, wherein said digital components for the six channels are sequentially stored in said three segments in the order of first, second, third, first, second and third segments.

5. A digital video signal recording method according to claim 3, wherein said digital components for the six channels are sequentially stored in said three segments in the order of first, third, second, first, third and second segments.

6. A digital video signal recording method according to claim 1, wherein said recurring channel pattern is

0, X1, 2, 0, X2, 3 wherein each of X1 and X2 is selected from any of the values 0, 1, 2, and 3.

7. A digital video signal recording method according to claim 6, wherein said first predetermined increment amount in step (d) is selected any one from 1 and 3.

8. A digital video signal recording method according to claim 6, wherein said second predetermined increment amount in step (d) is selected any one from 1 and 3.

9. A digital video signal recording method according to claim 1, wherein said recurring channel pattern is 0, 2, X1, 1, 3, 0 wherein X1 is selected from any of the values 1 and 2.

10. A digital video signal recording method according to claim 9, wherein said first predetermined increment amount in step (d) is 1.

11. A digital video signal recording method according to claim 9, wherein said second predetermined increment amount in step (d) is 1.

12. A digital video signal recording method according to claim 1, wherein said predetermined number of segments in step (b) is four segments comprising a first segment, a second segment, a third segment and a fourth segment aligned in said order.

13. A digital video signal recording method according to claim 12, wherein said recurring channel pattern in step (c) includes eight channels.

14. A digital video signal recording method according to claim 13, wherein said digital components for the eight channels are sequentially stored in said four segments in the order of first, first, second, second, third, third, fourth and fourth segments.

15. A digital video signal recording method according to claim 1, wherein said recurring channel pattern is 0, 2, X1, X1+2, 0, 2, X1, X1+2 wherein X1 is selected from any of the values 0, 1, 2 and 3.

16. A digital video signal recording method according to claim 15, wherein said first predetermined increment amount is selected from any of the values 1 and 3.

17. A digital video signal recording method according to claim 15, wherein said second predetermined increment amount is selected from any of the values 1 and 3.

18. A digital video signal recording method according to claim 1, further comprising the steps of:

(i) shuffling each of said four digital components; and (j) shifting a predetermined distance when it comes to read said second type luminance signal component from a location where said first type luminance signal component is stored.

19. A digital video signal recording method according to claim 18, wherein said shuffling step (i) is carried out such that said first type luminance signal component and two color difference signal components are shuffled according to a same first predetermined rule, and said second type luminance signal component is shuffled according to a second predetermined rule.

20. A digital video signal recording method according to claim 18, wherein said predetermined distance is selected from any of the values 19, 34, 35, 9, 21, 16 and 18.

21. A digital video signal recording apparatus for recording a video signal expressed by four digital components such that even numbered pixel is expressed by a first type luminance signal component and two color difference signal components, and odd numbered pixel is expressed by a second type luminance signal component, and that one field of said video signal is stored in a predetermined number of segments, said apparatus comprising:

four different channels through which said four digital components are stored;

standard channel order setting means for setting a standard channel order of a recurring channel pattern;

aligning means for aligning channels based on said standard channel such that a first group is the standard channel order, and following groups take such an order that the standard channel order is shifted, after each group, by a first predetermined increment amount, and also that the channel order in one line is shifted, after each line, by a second predetermined increment amount;

first allocating means for allocating said first and second type luminance signal components with said aligned channels;

first assigning means for assigning sequentially said predetermined number of segments to said first and second type luminance signal components;

second allocating means for allocating said two color difference signal components with channels based on said aligned channels such that every other channel data from said aligned channels are taken and each channel data is repeated twice; and second assigning means for assigning sequentially said predetermined number of segments to said two color difference signal components, whereby said first type luminance signal component and two color difference signal components for the even numbered pixel are stored in a same segment by the same channel.

22. A digital video signal recording apparatus according to claim 21, wherein said predetermined number of segments is three segments comprising a first segment, a second segment and a third segment aligned in said order.

23. A digital video signal recording apparatus according to claim 22, wherein said recurring channel pattern includes six channels.

24. A digital video signal recording method according to claim 23, wherein said digital components for the six channels are sequentially stored in said three segments in the order of first, second, third, first, second and third segments.

25. A digital video signal recording method according to claim 23, wherein said digital components for the six channels are sequentially stored in said three segments in the order of first, third, second, first, third and second segments.

26. A digital video signal recording apparatus according to claim 21, wherein said recurring channel pattern is

0, X1, 2, 0, X2, 3 wherein each of X1 and X2 is selected from any of the values 0, 1, 2, and 3.

27. A digital video signal recording apparatus according to claim 26, wherein said first predetermined increment amount is 1.

28. A digital video signal recording apparatus according to claim 26, wherein said second predetermined increment amount is selected from any of the values 1 and 3.

29. A digital video signal recording apparatus according to claim 21, wherein said recurring channel pattern is 0, 2, X1, 1, 3, 0 wherein X1 is selected from any of the values 1 and 2.

30. A digital video signal recording apparatus according to claim 29, wherein said first predetermined increment amount is 1.

31. A digital video signal recording apparatus according to claim 29, wherein said second predetermined increment amount is 1.

32. A digital video signal recording apparatus according to claim 21, wherein said predetermined number of segments is four segments comprising a first segment, a second segment, a third segment and a fourth segment aligned in said order.

33. A digital video signal recording apparatus according to claim 32, wherein said recurring channel pattern includes eight channels.

34. A digital video signal recording apparatus according to claim 33, wherein said digital components are sequentially stored in said four segments in the order of first, first, second, second, third, third, fourth and fourth segments.

35. A digital video signal recording apparatus according to claim 21, wherein said recurring channel pattern is 0, 2, X1, X1+2, 0, 2, X1, X1+2 wherein X1 is selected from any of the values 0, 1, 2 and 3.

36. A digital video signal recording apparatus according to claim 35, wherein said first predetermined increment amount is 1.

37. A digital video signal recording apparatus according to claim 35, wherein said second predetermined increment amount is selected from any of the values 1 and 3.

38. A digital video signal recording apparatus according to claim 21, further comprising:

shuffling means for shuffling each of said four digital components; and shifting means for shifting a predetermined distance when it comes to read said second type luminance signal component from a location where said first type luminance signal component is stored.

* * * * *